US012594736B2

(12) United States Patent
Hudson, Jr.

(10) Patent No.: US 12,594,736 B2

(45) Date of Patent: Apr. 7, 2026

(54) ADDITIVE MANUFACTURING METHOD AND APPARATUS FOR INDIVIDUALIZED POLYPILL CAPSULES USING MICRO-DOSED AND COMPACTED POWDERS

(71) Applicant: OneFul Health, Inc., Cary, NC (US)

(72) Inventor: Edison Thurman Hudson, Jr., Chapel Hill, NC (US)

(73) Assignee: OneFul Health, Inc., Cary, NC (US)

( * ) Notice: Subject to any disclaimer, the term of this patent is extended or adjusted under 35 U.S.C. 154(b) by 72 days.

(21) Appl. No.: 18/441,356

(22) Filed: Feb. 14, 2024

(65) Prior Publication Data

US 2024/0269951 A1 Aug. 15, 2024

Related U.S. Application Data

(60) Provisional application No. 63/484,936, filed on Feb. 14, 2023.

(51) Int. Cl.
*B30B 15/30* (2006.01)

(52) U.S. Cl.
CPC .................................. *B30B 15/302* (2013.01)

(58) Field of Classification Search
CPC ........ B30B 15/302; B33Y 30/00; B33Y 50/02
See application file for complete search history.

(56) References Cited

U.S. PATENT DOCUMENTS

| | | |
|---|---|---|
| 5,074,102 A | 12/1991 | Simpson et al. |
| 5,879,458 A | 3/1999 | Roberson, Jr. et al. |

(Continued)

OTHER PUBLICATIONS

Pharmaceutical Technology, "Enhancement of Xcelodose Capsule-Filling Capabilities Using Roller Compaction", Pharmaceutical Technology, vol. 30, Issue 2. Retrieved from the Internet: <URL: https://www.pharmtech.com/view/enhancement-xcelodose-capsule-filling-capabilities-using-roller-compaction-0>, published Feb. 2, 2006, 6 pages.

(Continued)

*Primary Examiner* — Jason K Niesz

(74) *Attorney, Agent, or Firm* — NK Patent Law

(57) ABSTRACT

A method and apparatus enabling additive manufacturing of individualized oral therapeutic capsule forms containing multiple medicinal ingredients, also referred to as a personalized polypill process. A process and supporting apparatus to fulfil the formulated therapy prescribed by a physician to address the medical conditions of an individual patient, furthering the practice of personalized medicine. The methods and apparatus apply to the powder forms of active pharmaceuticals, dietary supplements, and specialized chemicals, such as diagnostic inks and dyes. The methods teach the deposition of computer-controlled amounts of high-potency powder forms of active ingredients deposited in sequential layers into a single delivery form. Each active ingredient layer is sequentially deposited to a programmable dosage accurately controlled with closed-loop gravimetric sensing, enabling sub-milligram mass deposition accuracy. Cumulative doses are compacted into segregated layers of programmable density with the optional addition of an inert barrier film between each chemical entity to minimize interactions.

5 Claims, 20 Drawing Sheets

(56) References Cited

U.S. PATENT DOCUMENTS

| | | | | |
|---|---|---|---|---|
| 6,074,688 | A | 6/2000 | Pletcher | |
| 6,113,945 | A | 9/2000 | Jacobs et al. | |
| 6,581,650 | B2 * | 6/2003 | Parks | B65B 9/042 141/2 |
| 6,802,313 | B2 | 10/2004 | Pletcher | |
| 9,168,223 | B2 | 10/2015 | Alfano | |
| 2001/0047837 | A1 | 12/2001 | Parks et al. | |
| 2007/0193646 | A1 | 8/2007 | Tapphorn et al. | |
| 2008/0283144 | A1 * | 11/2008 | Rapparini | B30B 15/302 141/73 |
| 2009/0014086 | A1 | 1/2009 | MacMichael et al. | |
| 2011/0086092 | A1 | 4/2011 | Kaplan | |

OTHER PUBLICATIONS

Edwards, David, "Applications of capsule dosing techniques for use in dry powder inhalers", Future Science, pp. 195-201, ISSN 2041-5990. Retrieved from the Internet: <URL: https://pubmed.ncbi.nlm.nih.gov/22816126/>, published Jun. 25, 2010, 2 pages.

ISA/US, International Search Report and Written Opinion for International Patent Application No. PCT/US2024/015715, mailed Jul. 11, 2024, 12 pages.

Chen, et al., "Mechanism study of ultrasonic-assisted screening of fine powder materials", Journal of Physics: Conference Series vol. 2369 No. 1, IOP Publishing, published Nov. 1, 2022, 10 pages.

* cited by examiner

ADDITIVE MANUFACTURING METHOD AND APPARATUS FOR INDIVIDUALIZED POLYPILL CAPSULES USING MICRO-DOSED AND COMPACTED POWDERS

CROSS-REFERENCE TO RELATED APPLICATION

This application claims the benefit of U.S. Provisional Patent Application No. 63/484,936, filed on Feb. 14, 2023, titled "ADDITIVE MANUFACTURING METHOD AND APPARATUS FOR INDIVIDUALIZED POLYPILL CAPSULES USING MICRO-DOSED AND COMPACTED POWDERS," the entire contents of which are incorporated herein by reference.

TECHNICAL FIELD

The described invention is directed to active pharmaceutical ingredients (APIs), nutritional, nutraceutical, or other therapeutic or diagnostic compounds produced as dry powders.

BACKGROUND

Once processed and desiccated, powders are the most common stable delivery format for small-molecule chemicals. Powder formats typically have a long potential shelf-life if kept dry and not exposed to elevated temperatures (greater than 30° C.) or illumination with bright light (UV).

Dry powders pose numerous challenges for manufacturing owing to their physical properties and propensities to form aerosols and adhere to most surfaces. Powders are broadly grouped into two main categories based on flow properties: free-flowing and cohesive. Free-flowing powders do not cling together, whereas cohesive powders stick to each other and form aggregates that do not disperse uniformly during mixing. Several factors influence the formation of aggregates, such as moisture, electrostatic charges, and inter-particle forces. Additionally, the tendency of powders to be cohesive increases as particle size decreases; in other words, smaller particles tend to be more cohesive, while larger particles are more likely to be free-flowing. Several techniques and equipment are commercially available to filter, sort, measure, and analyze the primary characteristics of powders, providing the tools necessary to establish the parameters for accurate deposition in an additive manufacturing process.

The manufacture of combination capsules for oral therapies is predominantly performed today by combining multiple active ingredients in a dry powder state and mixing them into a single blended powder in a specialized blender. This process supports the high-speed filling of capsules with a single composite powder formulated at a fixed ratio of ingredient masses. Many methods have been used to precisely dose individualized small quantities of powder in the pharmaceutical or nutraceutical industry. These methods typically measure powder quantities using volumetric approaches based on a predetermined ingredient density. Active ingredients are prescribed by their mass, so gravimetric measurement can provide accurate measure given the variability of powder densities owing to factors such as humidity, processing variations, handling, etc. However, real-time control of powder deposition that adapts to powder particle size, flowability, or density is typically limited to research applications due to the slow speed of gravimetric sensors.

It is still difficult to determine the precise dosing of powder in pharmaceutical development or manufacturing. To avoid over or under-dosing, powder behavior must be well characterized prior to dispensing. Powder dosing behavior is affected by powders' bulk density, particle size distribution, particle shape, flowability, and compressibility. High dose uniformity is required by regulatory requirements, especially when the therapeutic window for devices delivering small quantities of highly potent actives is limited. The volumetric filling process is the industry standard basis of most capsule-filling methods. Filling machines using devices known as dosators and tamp fillers are commonplace in the volume-controlled hard gelatin capsule filling. These systems typically have powders that are initially loaded into chambers with a fixed volume to determine the final dosage in the delivery capsule. The final weight of a powder is determined by its volume based on an average known density of powder. Some systems statistically sample the filled capsules to verify the density value applied to the powder filling, by weighing a small typically sampling of filled capsules, usually less than 1% of output. This commonly accepted statistical quality method does cannot eliminate all over/under dosed capsules, which for critically dosed ingredients could have important therapeutic impacts or produce dangerous side effects. All these statistical sampling methods to verify the filled mass of ingredients are inherently time-consuming, limiting the use of these methods at the capsule level to research and low-volume applications.

In some formulations, the active ingredients may need to be preprocessed to increase density, more uniform granularity, or improved flowability. Another trend in oral solid dosage forms is to put small amounts of pure active pharmaceutical ingredients (API) into micro-capsules to produce time-delay release, or to promote the flowability of ingredients that agglomerate due to high cohesion. These methods improve flowability, but significantly decrease active drug density, thereby requiring large capsules and limiting the number of drugs that can be combined in capsules.

In contrast to these methods, having the technology to use pure powder forms eliminates the need to add lubricant agents, fillers, or binders to the formulation to improve capsule filling. Such additives, or excipients, are sometimes cited as sources of allergic reactions in patients or have variable impacts on bioavailability. Excipients and the low-drug loading of micro-encapsulation also increase the need for larger or multiple capsules to deliver efficacious dosage levels, further exacerbating treatment adherence, particularly for patients with swallowing disorders, children, and pill aversion.

Given the number of unique chemical entities and the multitude of dosing ranges that are applied in medical practice, the above blending method would require thousands of permutations of composition to serve individualized needs. This requirement demands a method that uses an on-demand fulfillment of a formulation by depositing each ingredient as commanded, analogous to a color printer accurately adding each ink to create a unique image from toner cartridges.

Volumetric dosing systems for capsule filling have fundamental problems. The dose weight depends on the powder's densification and processing history. Powder beds are required for most volumetric techniques. This means there will always be some powder left over, as not all powder can be used. Low-dose filling (10 mg) has been shown in limited cases for industry standard apparatus known as nozzle dosator systems. These volumetric dosing methods can be faster than other methods but are not as precise or efficient as gravimetric dosing. Micro-dosing using vibrating capillaries, rods, and ultrasonic actuators is a promising method for low dosing or feeding. It has been investigated for solid-free-forming powders. The "pepper shaker" principle, MG2 Microdose, Capsugel Xcelodose (1,2), and 3P Innovation Fill2weight, was demonstrated to be capable of low dosing with high accuracy (relative standard deviation below 5%) when used for capsule filling. In traditional high volume solid-form drug manufacturing, continuous powder processing is the accepted process in pharmaceutical manufacturing. Continuous feeding of powder materials at a constant flow rate of many kilograms per hour is possible with standard technologies. Although it is possible to achieve high constant powder flow rates, this can pose a problem of accuracy for powders with low or medium flowability. Feed screw-based feeders do not suit this task. Gravimetric (micro)-dosing techniques using the pepper-shaker principle may be applied to continuous dose material to a powder stream. Micro-feeding (<1 mg/s) has been reported via vibratory channels or auger methods. Vibratory channels used to apply vibrations to pharmaceutical capsules have the issue that powders stick to the flow channel, restricting effective orifice diameter, and becoming inaccurate unless manually cleared or cleaned by other methods.

A problem faced by healthcare systems includes polypharmacy-induced multiple prescription non-adherence and one-size-fits-all pharmaceutical formulations that do not consider individual genomic, metabolic, or health status. The prevailing system for pharmaceutical treatment is to prescribe multiple pills (e.g. capsules, tablets, sachets, etc.) and/or liquids of fixed doses to patients under standardized treatment protocols using mass-produced medications. Such polypharmacy approaches exacerbate adherence due to increased "pill burden", a phenomenon to which one of every twenty deaths in the United States is attributed. Problematically, the pill burden problem is exacerbated in populations that struggle with pill consumption, which are often the populations that need treatments the most, such as pediatrics and geriatrics. Thus, there is an imminent need to develop novel therapeutic consumption systems that can be personalized in mass volumes and promote adherence to complex multiple-drug regimens. The "one-size-fits-all" protocols using only the commercially available fixed combinations and doses rarely incorporates potentially beneficial genomic, metabolic, and other biomarker information about specific patients, often resulting in adverse health outcomes. Fully personalized medical treatment demands that each active ingredient incorporated in the therapy must be independently selected and dosed according to the patient's medical need as determined by a physician using all available biomarkers.

SUMMARY

This disclosure teaches a method to produce on-demand manufacture of individually customized combination capsules known as polypills. A polypill replaces multiple pills or provides a medical strategy to encourage therapy adherence for an extended period, as is typical for chronic disease treatments. The polypill concept has been shown in multiple clinical trials to reduce the risk of severe medical events, such as heart attack and stroke, by an average of 50% per annum. State-of-the-art commercial medications limit polypill design to fixed combinations of active ingredients at predetermined fixed dosages. Such fixed combination polypills in multiple clinical trials and medical practice have been shown to increase higher adherence to medical regimens designed to control chronic diseases, such as cardiovascular disease, HIV, mental health, and others. While fixed polypills can serve primary prevention in large populations of patients with similar medical risks, this approach cannot serve medical demands for diagnosed complex conditions or prevention of most secondary events. Fixed combinations are also have had significant barriers to regulatory approval, as combinations of more than two active drug ingredients are rarely approved by bodies such as the FDA. The current fixed combination polypill designs also limit the professional judgment of physicians to prescribe the correct combinations and doses that may be needed for individuals. The fixed combination and dosage of the polypills produced to date in international markets (none in the USA beyond two ingredients), cannot make use of new scientific knowledge of pharmacogenomics which can guide physicians to prescribe the optional combination and dosage to match individual drug metabolism profiles as predicted from commercially available tests. This invention teaches the method to produce a personalized polypill serving individual needs by additively making individualized combinations of active ingredients at prescribed doses to a digitally defined formulation defined by a medical professional.

In some embodiments, the present invention includes a method and apparatus enabling on-demand precise dispensing of variable amounts of two or more high-potency powder forms of active ingredients, including pharmaceuticals, dietary supplements, and specialized chemicals such as inks and dyes, additively dispensing them and compacting them into segregated layers in a capsule or other small consumable oral format. Applying novel in-process and real-time mass and volume measurement methods to computer-controlled dispensing and compacting each powder enables dispensing at sub-milligram mass accuracy.

In some embodiments, the present invention includes a method for creating a multi-ingredient capsule, or polypill, filled with two or more active ingredients powders, each at commanded dosage levels, the powders compacted to maximum viable density, each ingredient dispensed in increments as small as one microgram, sequentially added to a single capsule to produce a combination therapy by a digitally prescribed formula.

In some embodiments, the present invention includes a dosing and compaction system, comprising: a machine learning component configured to analyze data for a plurality of powder characteristics; a feedback component interfaced with the machine learning component and configured to provide feedback (e.g., alerts, recommendations, analysis) regarding dosing and compaction; a controller interfaced with the feedback components, the controller configured to adjust the dosing and compaction based on the feedback; and an output component interfaced with the controller and configured to measure a total mass loaded by the plurality of dispensing operations, wherein the measured total capsules loaded are within a desired specification of multiple active ingredients.

In some embodiments, the present invention includes a cylindrical powder sieving apparatus including a powder collection chamber, a tamping head located at the top end of the powder collection chamber, a metallic microporous receiver surface located at the bottom end of the powder collection chamber, and a micro-gas balance flow generator positioned between an upper micro-porous plate and a lower micro-porous plate. The upper micro-porous plate and the lower micro-porous plate include opposite electrical static charges to control the flow of an inert gas directed at the dispensed powder and synchronized with the inert gas flow direction. The flow rate of the inert gas is balanced such that the flow rates between the upper micro-porous plate and the lower micro-porous plate are identical, creating a laminar flow through the powder sieving apparatus that is controlled by a single rate controller. The cylindrical powder sieving apparatus further includes a self-clearing mechanism for each cycle to prevent blockage caused by the positive pressure of the tamping head passing through the sieving cylinder.

In some embodiments, the present invention includes a method to control a precision powder stream and accelerate that stream to achieve rapid deposition. The method includes a deposition apparatus including a cylindrical sieve with a matrix of orifices, dimension of orifices, and matrix pattern selected to optimize powder accuracy and flow rate based on an algorithm relating these mechanical factors to the ingredient powder particle size distribution and flowability. The cylindrical sieve is actuated by a controlled variable frequency ultrasonic rotary actuator, with frequency and amplitude of rotation determined by empirical calibration and machine learning correlation for each ingredient to which the feeder module is dedicated. The design of some elements of the apparatus are selectable to be optimized to the particle size and flowability of a specific ingredient powder. For example, and not limitation, the powder sieving cylinder is selected based on a mathematical model of these ingredient characteristics and on machine learning driven calibration methods derived from empirical test data during calibration of the apparatus with the physical powder. Once the optimal design of the sieve element is determined and selected from a multitude of alternative sieve designs with varying orifice diameters and array patterns, then the selected sieve element is assigned to be dedicated to that ingredient for optimal production accuracy and throughput.

In some embodiments, the present invention includes an algorithm specifying dimensional factors for optimization of a specific ingredient powder, wherein the cylindrical sleeve is 3D printed or machined to match the algorithm-specified matrix of orifices and dimensional factors optimization for a specific ingredient powder.

In some embodiments, the present invention includes a closed loop feedforward computer control of mass/volume/charge to accommodate bulk density, flowability, and particle size.

In some embodiments, the present invention includes a real-time mass deposited estimation for each ingredient based on charge level at the collection plate.

In some embodiments, the present invention includes use of microporous materials at top and bottom of metering sieve to provide amplification of powder flow rate in combination with electrostatic force on particles, with positive pressure from top plunger and negative pressure at bottom of collection chamber and opposite electrostatic charges forming an anode and cathode for attracting powder particles into a collection vessel.

In some embodiments, the present invention includes a powder collection chamber including a bottom metallic micro-porous receiver surface with opposite electrical static charge to control flow of inert gas directing the flow of dispensed powder synchronized with inert gas flow direction.

In some embodiments, the present invention includes acceleration of electrostatic flow with controlled inert gas flow rate through micro-mesh electrically conductive mechanics.

In some embodiments, the present invention includes compaction of dosed powders in a secondary process to achieve "tapped" or tamped densities typical for various powders, with simultaneous use of high mechanical compression with negative pressure to evacuate interstitial inert gases.

In some embodiments, the compaction of the commanded amount of dispensed powders is performed by the motion of the top micro-mesh plunger, that also serves to eject the compacted ingredient cylindrical plug, when the bottom micro-mesh receiver surface is removed by an actuator to expose the ejection cylinder, and perfect the transfer of the compacted powder into the awaiting open capsule body.

In some embodiments, the collection and compaction of the commanded amount of dosed ingredient is performed by the top micro-mesh plunger, and the completed ingredient plug is transferred by rotary or linear motion to a location where the ejection into the awaiting capsule occurs by the actuation of a different plunger, thereby enabling the apparatus to perform the dispensing and compaction actions in parallel to the ejection of the ingredient plug into the capsule, increasing throughput of the system.

In some embodiments, the present invention includes interstitial barrier layers dispensed or applied to physically segregate active ingredients to prevent chemical or mechanical interaction of adjacent layers, such barriers constructed of thin gelatin or cellulose film, or composite materials with known dissolution and safe ingestion properties.

In some embodiments, the present invention includes a single capsule filled with two or more powders compacted to the maximum known density, reducing the volume of deposited ingredients to a level that does not impair bioavailability. In some embodiments, the present invention includes a machine learning and adaptive feedback component designed to analyze the compaction percentage to achieve optimal mass density.

In some embodiments, the present invention includes a dedicated feeder for each homogenous powder type, previously optimized and calibrated to deliver a precise amount of powder at the degree of compression desired based on machine learning to adjust frequency and/or force and select sieve pore size and geometry from a lookup table to configure elements to specific active ingredient powder and properties.

In some embodiments, the present invention includes electronic means of positive identification of stored active ingredient when apparatus mounted to the filling system, to ensure the correct dispensing of the prescribed ingredient, eliminating medication errors, with the transfer of powder characteristic parameters to the closed loop metering control computer.

In some embodiments, the present invention includes multiple feeders sequentially on a computer-controlled automation platform, each feeder additively dispensing parametrically controlled specific mass of ingredient in accordance with the digital formulation.

In some embodiments, the present invention includes production planning software to predict the size capsule and the optimal order from a size palette to minimize changeovers in feeder configuration on a system, wherein the selection of the capsule size and optimal execution order will determine the optimal changeover sequence of the feeder configuration. Production processing sequence to minimize changeovers of feeder configuration on system is calculated for all production orders.

In some embodiments, the present invention includes production software to predict the total allowable volume per capsule to fit in the volume of the capsule size in use, and to select the best fit standard capsule size ranging from 000 to 5 (see USP 24 specifications).

In some embodiments, the present invention includes two-stage powder storage, bulk feeding into a smaller volume as a buffer vessel, (less than 10% of bulk store), containing at center the cylindrical sieve, with a purpose to limit mass on the sieve a level to minimize damping of the frequency of the ultrasonic actuator, enhancing measurement precision.

In some embodiments, the present invention includes auto replenishment of buffer feed vessel based on net loss of mass from previous deposit cycle, such that a constant level of mass, as determined by direct measurement of net mass in the buffer chamber using capacitive or strain sensors, and calculation of usage for each dispense, such that the sieve's mass load.

In some embodiments, the present invention includes the promotion of powder particles through the sieve orifice matrix resulting from venturi effects of the flowing air column and back pressure from a buffer milligrams capacity held under an inert gas environment at controlled pressures.

In some embodiments, the present invention includes controlled humidity bulk storage of powders in a removable vessel filled with inert gas (such as desiccated N2), at atmospheric pressure, recirculated on demand by an inline humidity sensor through a central dryer system.

In some embodiments, the present invention includes a check valve system to equalize pressures between bulk and dosing vessels.

In some embodiments, the present invention includes clearing of dosing sieve with positive pressure microporous cylinder element, further increasing mixing in the buffer storage, preventing cohesion.

In some embodiments, the present invention includes use of the compaction device to eject and load formed ingredient into open capsule end to a calculated depth, while continuing to apply negation pressure, then reversing to positive pressure to release pellet and withdraw from capsule.

In some embodiments, the present invention includes micro gas balance flow generator between upper micro-porous plate and lower micro-porous plate with concurrent negative top plate pressure and positive bottom plate pressures balance such that flow rates are identical, creating laminar flow controlled by a single rate controller.

In some embodiments, the present invention includes self-clearing of the sieve mechanism on each cycle to avert clogging and blockage, the positive pressure of the tamping head as it passes by the orifices of the sieve when the bottom micro-pore plate is sealed.

In some embodiments, the present invention includes compaction of powder in collection reservoir using multiple tamping steps less than 0.5 mm at frequency greater than 10 Hz of pre-dosed powder in continuous evacuated chamber to achieve highest (using high force and frequency linear motor or voice coil apparatus to apply forces. Linear micro-distance measurement of final volume of compacted powder to calculate density.

In some embodiments, the present invention includes measurement of net mass in buffer chamber after each cycle as input to feedforward closed loop dosing algorithm using precision gravimetric sensors, such as inductive, capacitive, or load cell.

In some embodiments, the present invention includes controller for coordination and sequencing of multiple dispense operations by ingredient-dedicated apparatus to fill capsule loading within specifications.

In some embodiments, the present invention includes logging and reporting system to create a bill of materials of each capsule, logging measured deposits of each ingredient, sum total mass loaded into each capsule, and linkage to the order number or customer identification for the capsule filling formulation processing on the filling system.

BRIEF DESCRIPTION OF THE DRAWINGS

The previous summary and the following detailed descriptions are to be read in view of the drawings, which illustrate some (but not all) embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a carrier" can include a plurality of such carriers, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments+/−10%, in some embodiments+/−5%, in some embodiments+/−1%, in some embodiments+/−0.5%, and in some embodiments+/−0.1%, from the specified amount, as such variations are appropriate in the disclosed packages and methods.

Figure 1:
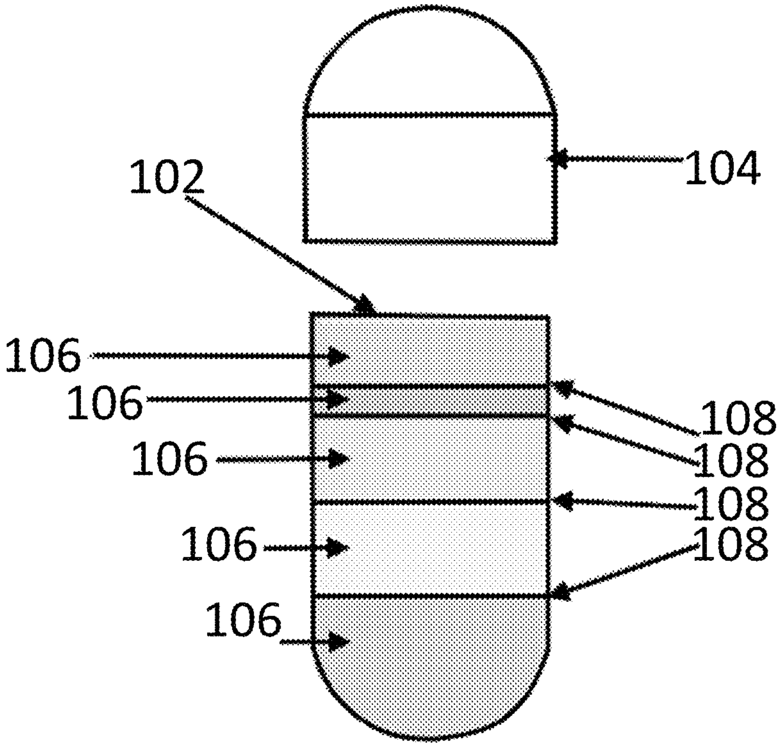
FIG. 1 illustrates a polypill.
Figure 2:
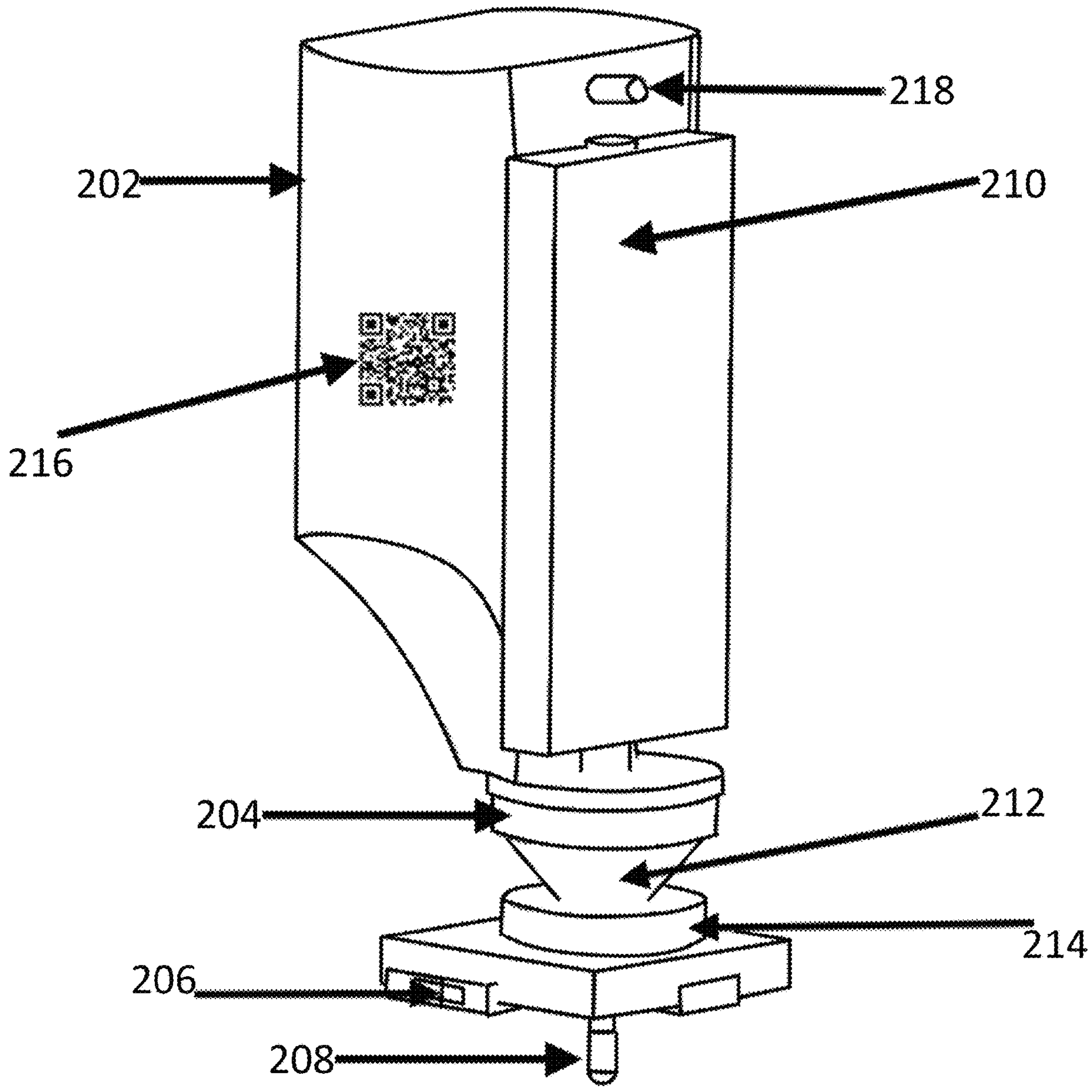
FIG. 2 illustrates a deposition apparatus according to one embodiment of the present invention.

This disclosure pertains to methods to individually dose and combine multiple active pharmaceutical ingredients (APIs) or nutritional or dietary supplement ingredients (DSI), (together "Ingredients") into pre-made oral capsule forms, sometimes known as a polypill. An exemplary polypill is shown in FIG. 1. For example, and not limitation, the polypill 100 includes a capsule body 102, a capsule top 104, a plurality of ingredients 106, and a plurality of interstitial barrier films 108. The methods herein teach the controlled dispensing of powder-form ingredients, additively deposited in layers using a computer-controlled apparatus and mass measurement systems. Each homogenous ingredient (or ingredient blend) is deposited to achieve a digitally commanded mass corresponding to a prescribed dosage. A layer of ingredient is mechanically compacted with pressure and vibration to reduce the volume required in a pre-made capsule of fixed volume. Sequentially, layers are stacked by multiple apparatuses into pre-manufactured capsules for oral consumption, commonly gelatin or cellulose capsules of standard sizes (from size 000 to size 5 conforming to industry standards, specifically USP 24, Table 1). Multiple deposition devices, each dedicated to a single homogenous active powder, are arranged on a computer-controlled filling machine to sequentially load capsules with multiple powders at doses programmed by a digital formula or prescription. (FIG. 2)

TABLE 1

Capsule Sizes, volume, and estimated fill limits (USP 24)

| | Capsule size/Volume [ml] | | | | | | | | | |
|---|---|---|---|---|---|---|---|---|---|---|
| | 000 | 00el | 00 | 0el | 0 | 1 | 2 | 3 | 4 | 5 |
| | Capsule capacity [mg] powder density | | | | | | | | | |
| | 1.37 [ml] | 1.02 [ml] | .91 [ml] | .78 [ml] | .68 [ml] | .50 [ml] | .37 [ml] | .30 [ml] | .21 [ml] | .10 [ml] |
| .6 [g/ml] | 822 | 612 | 546 | 468 | 408 | 300 | 222 | 180 | 126 | 78 |
| .8 [g/ml] | 1096 | 816 | 728 | 624 | 544 | 400 | 296 | 240 | 168 | 104 |
| 1 [g/ml] | 1370 | 1020 | 910 | 780 | 680 | 500 | 370 | 300 | 210 | 130 |

In some embodiments of implementing this method, a deposition apparatus integrates a sealed, dry powder storage compartment for a significant quantity of a single homogenous active ingredient or blend of ingredients as a homogenous powder. The storage logic is analogous to printer toner cartridges, with each cartridge containing a color of homogenous ink. The identity of the stored powder is digitally transferred to the deposition control computer. Such identification data includes the measured physical parameters of the stored powder, such as density, flowability, and compressibility, and other data as required by the deposition apparatus to adjust the closed-loop control algorithm of the deposition apparatus.

In some embodiments, as shown in FIG. 2, the present invention includes a deposition apparatus. The deposition apparatus 200 includes a bulk active ingredient powder storage 202 with desiccated inert gas atmosphere, a loading actuator 204 to replenish the buffer storage vessel, a base micro-porous plate 206 with a knife valve actuator and assembly, a capsule 208 in the process of being loaded by the feeder, a compaction rod actuator 210, a buffer storage vessel 212 including net mass measuring sensors, an ultrasonic rotary actuator 214 for a cylindrical sieve assembly, an identification symbol 216 corresponding to the stored powder that is linked to characterized data, and an inert gas inlet and pressure regulator 218. The bulk powder storage vessel may typically hold several liters, typically 1 to 5 liters. The bulk storage feeder is the supply to load a buffer storage vessel, holding a small fraction of the bulk capacity, to preload the deposition mechanism. This buffer vessel isolates a limited mass applied to the controlled deposition mechanism from the mass of the bulk storage which varies as the powder is consumed by deposition.

Figure 3:
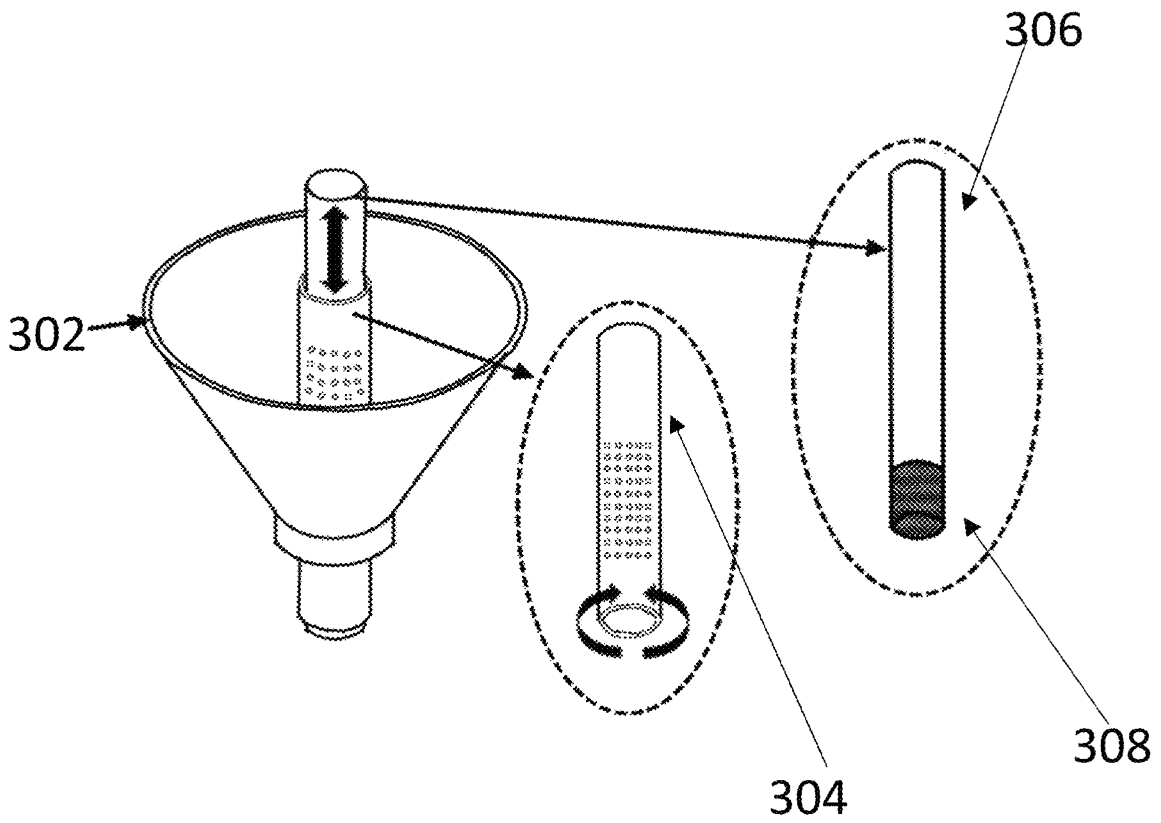
FIG. 3 illustrates a metering sieve and accumulator shaft of a deposition apparatus according to one embodiment of the present invention.

In another embodiment, the deposition apparatus includes a metering sieve and accumulator shaft as shown in FIG. 3. The deposition apparatus includes a buffer storage vessel 302 with a conical shape, a cylindrical metering sieve 304 with a pattern of aperture sized to emit powder particles when rotary actuation is applied, a vertically actuated cylinder 306 for powder movement, sieve clearing, and compaction, and a micro-porous head 308 to apply positive or negative gas flow, gas ionization, and compaction force. At the center of the buffer storage vessel is the primary deposition mechanism, consisting of a cylindrical metering sieve with a matrix of orifices that is actuated about the long cylinder axis. The accumulator shaft is actuated vertically and concentric to the cylindrical metering sieve. The vertically actuated cylinder carries the micro-porous flow and compaction top plate which generates inert gas flow and serves to clear the sieve, accumulate the residue powder and compact it in the collection vessel at the bottom.

Figure 4:
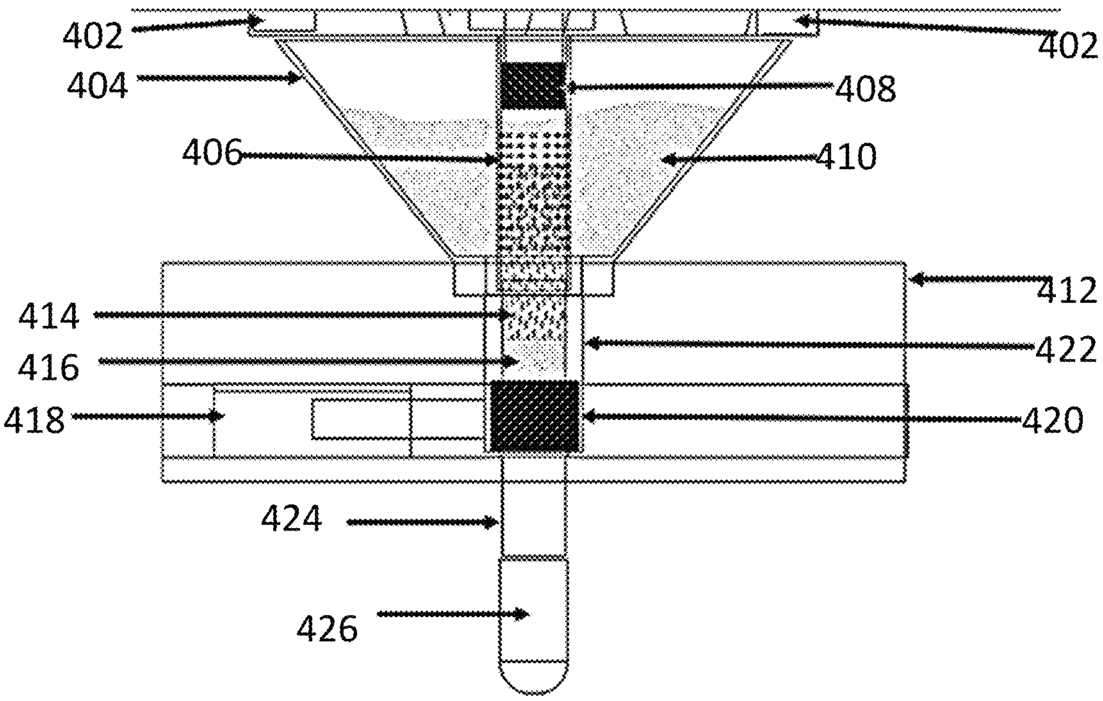
FIG. 4 illustrates a deposition apparatus according to one embodiment of the present invention.

In yet another embodiment, as shown in FIG. 4, the deposition apparatus includes a gravimetric mass sensor 402 (e.g., inductive, capacitive, strain), a buffer storage vessel 404, a sieve 406 for metering powder into a deposition channel, a porous airflow head 408 for creating positive pressure to accelerate powder flow, a powder load 410 in the buffer storage vessel 404, an ultrasonic rotary actuator 412 of sieve 406, a powder stream 414 flowing into an accumulation vessel, powder 416 accumulate collected in the accumulation vessel, an actuator 418 for escapement of the accumulation vessel, a bottom porous airflow head 420 for negative pressure to accelerate powder flow, the accumulation vessel and charge cathode 422, a capsule alignment tube 424, and a target capsule for filing 426. FIG. 4 shows the elements of the metering sieve, actuated by a controlled variable frequency ultrasonic rotary actuator, with frequency and amplitude of rotation under a closed loop motion controller.

Figure 5:
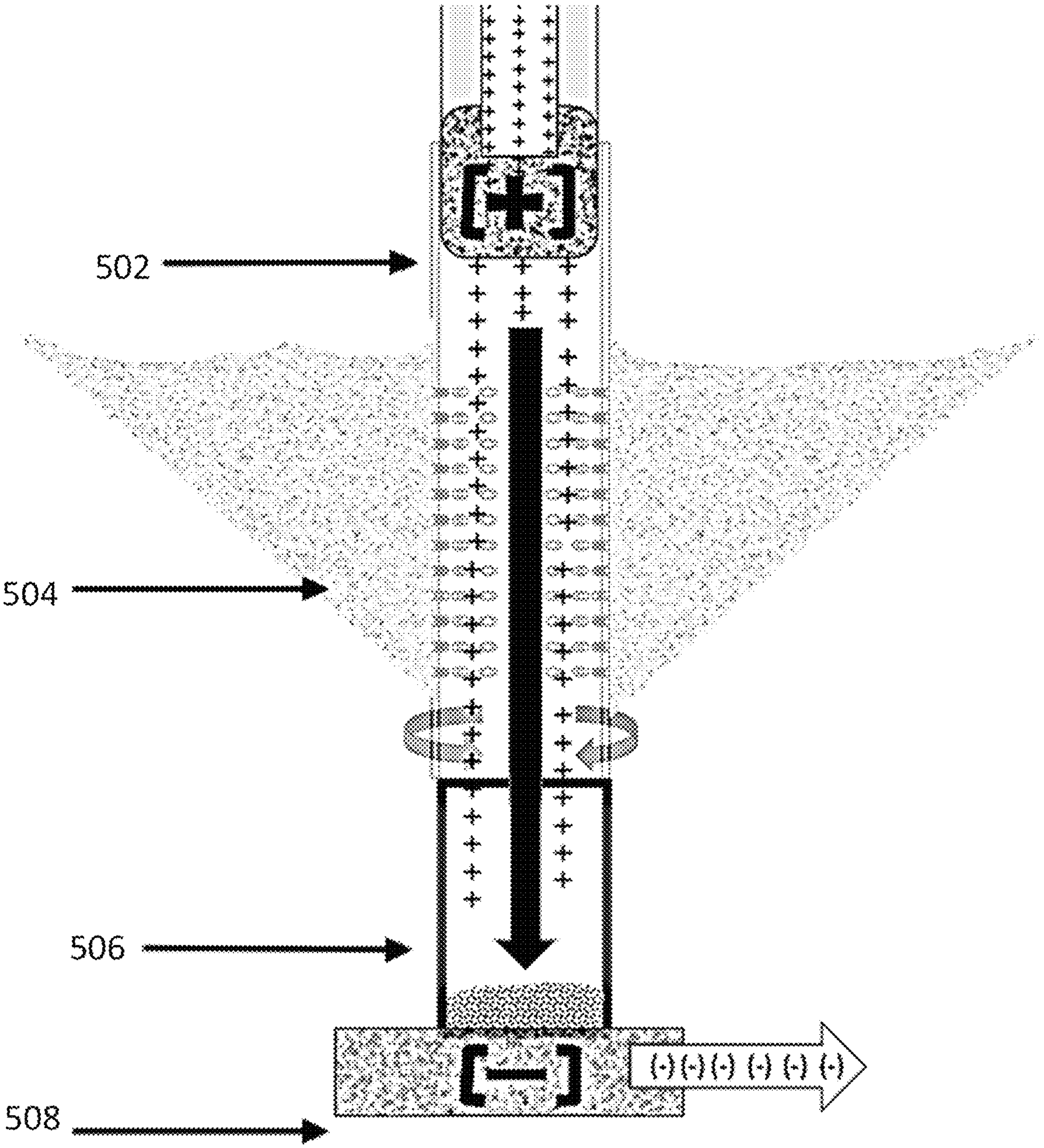
FIG. 5 illustrates inert gas and electro-statically charged particle flow of a deposition according to one embodiment of the present invention.

In one embodiment, the present invention includes a deposition apparatus designed for inert gas and electrostatically charged particle flow as illustrated in FIG. 5. For example, and not limitation, as shown in FIG. 5, the deposition apparatus includes a positive flow inert gas element and electrostatic charge electrode 502, a powder 504 in a conical buffer feeder supplying a cylindrical metering sieve, a powder collection vessel 506 for accumulating powder flow, and a negative flow collector and particle charge sink 508. FIG. 5 shows the use of microporous materials at top and bottom of the cylindrical metering sieve, powder flow is amplified with positive pressure from top plunger element and negative pressure at the bottom of the collection chamber. Powder collection chamber contains a bottom metallic microporous receiver surface with the opposite electrical static charge to control the flow of inert gas directing the flow of dispensed powder driven by the inert gas flow direction, Powder flow rate is amplified by positive pressure from top plunger plate and negative pressure at the bottom plate of the collection chamber.

Figure 6:
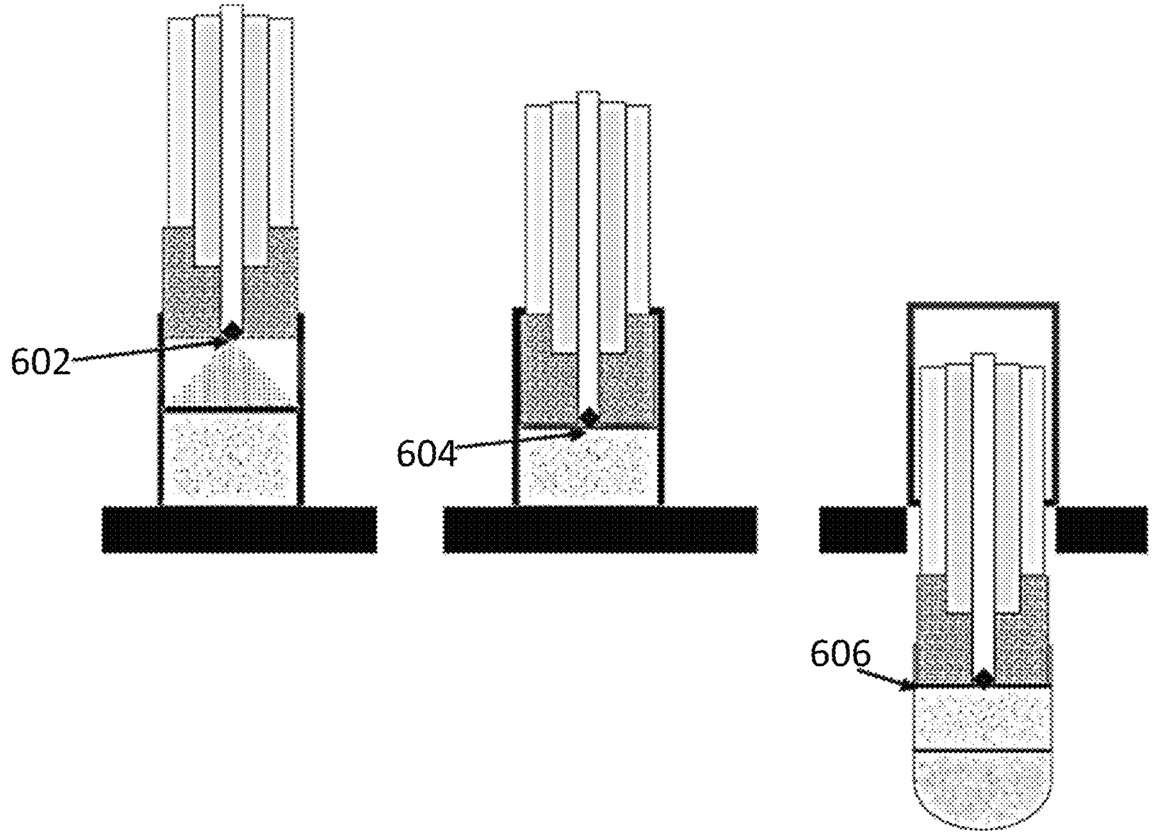
FIG. 6 illustrates a process of creating an interstitial barrier film according to one embodiment of the present invention.

In another embodiment, the present invention includes a deposition apparatus designed to generate an interstitial barrier film as shown in FIG. 6. For example, and not limitation, the deposition apparatus is designed to dispense the barrier film materials via a sprayer 602, compress 604 the barrier film and deposited ingredient, and eject the deposited ingredient and barrier layer into a preformed capsule body 606. FIG. 6 illustrates an embodiment in which an interstitial film is dispensed as a composite powder and compressed between layers of ingredients to create a barrier. FIG. 6 also illustrates an embodiment in which a preformed barrier film is inserted on top of the deposited and compacted ingredient layer.

Figure 7:
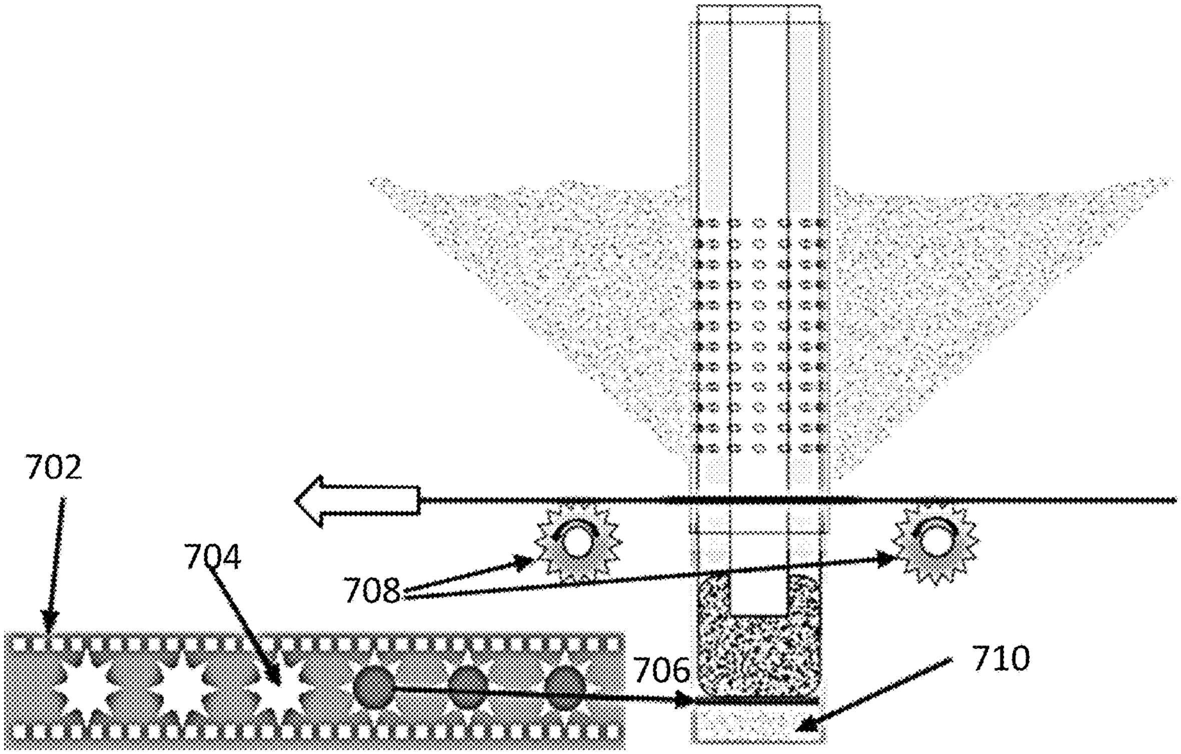
FIG. 7 illustrates a method of inserting a pre-formed interstitial barrier film on top of a compressed ingredient layer of a capsule according to one embodiment of the present invention.

In yet another embodiment, the present invention includes a deposition apparatus designed to insert pre-formed interstitial barrier films on top of a compressed ingredient layer as shown in FIG. 7. As shown in FIG. 7, the present invention includes a preformed index tape 702 including empty preforms, ready to insert preforms, and empty position of used pre-form film 704. The deposition apparatus further includes a pre-form inserted on top of compacted ingredient powders 706 and an indexing actuator 708 to move the preformed index tape 702 to a second position. The deposition apparatus further includes a compacted ingredient powder layer 710.

Figure 8:
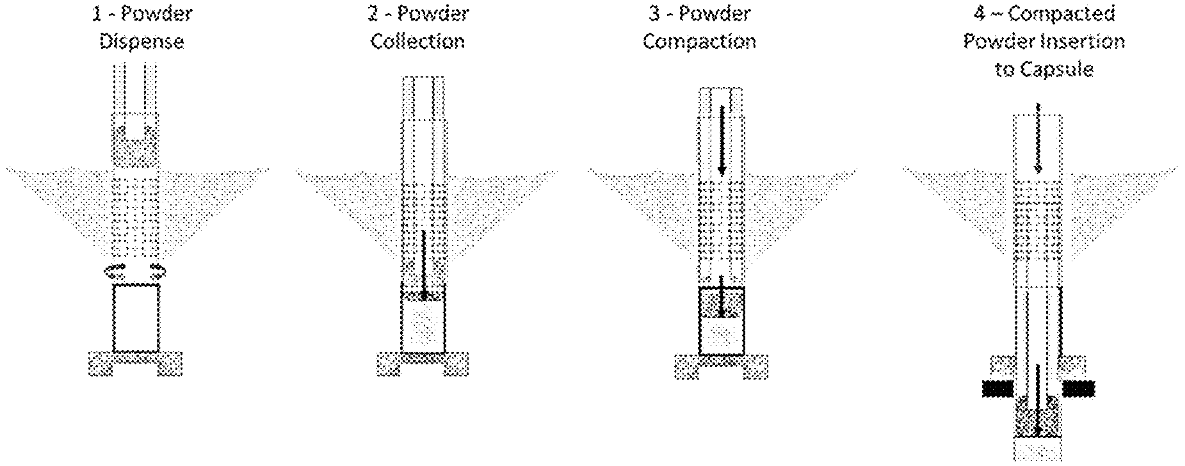
FIG. 8 illustrates a process of depositing powder into a capsule via a deposition apparatus according to one embodiment of the present invention.
Figure 9:
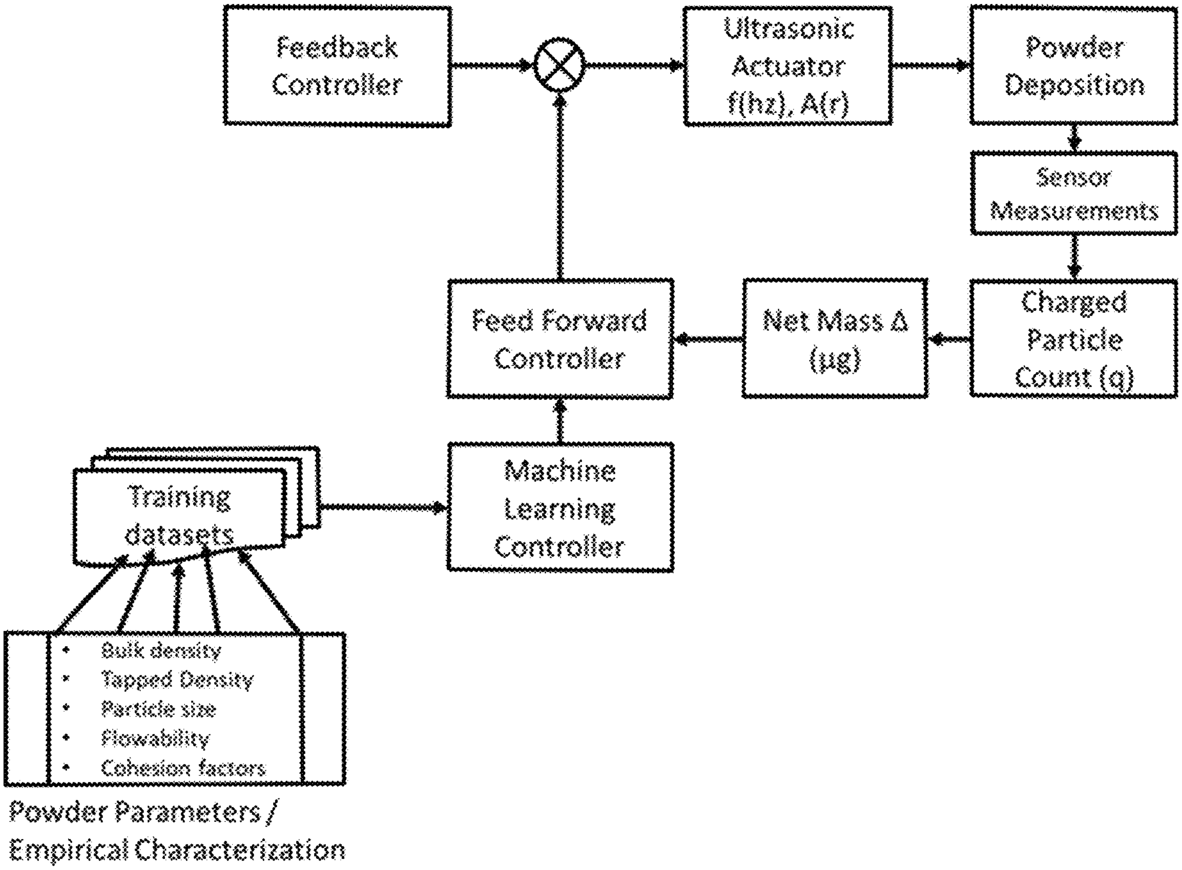
FIG. 9 illustrates a schematic diagram of a feedforward controller using powder characteristics machine learning model.
Figure 10:
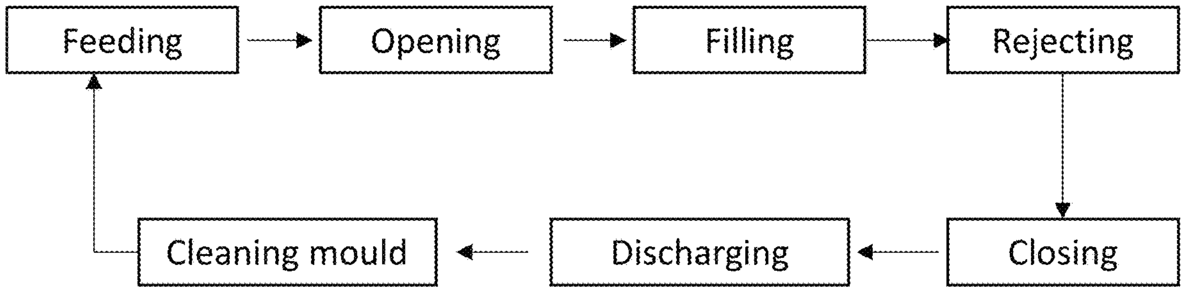
FIG. 10 illustrates a schematic diagram of a control computer system according to one embodiment of the present invention.
Figure 11:
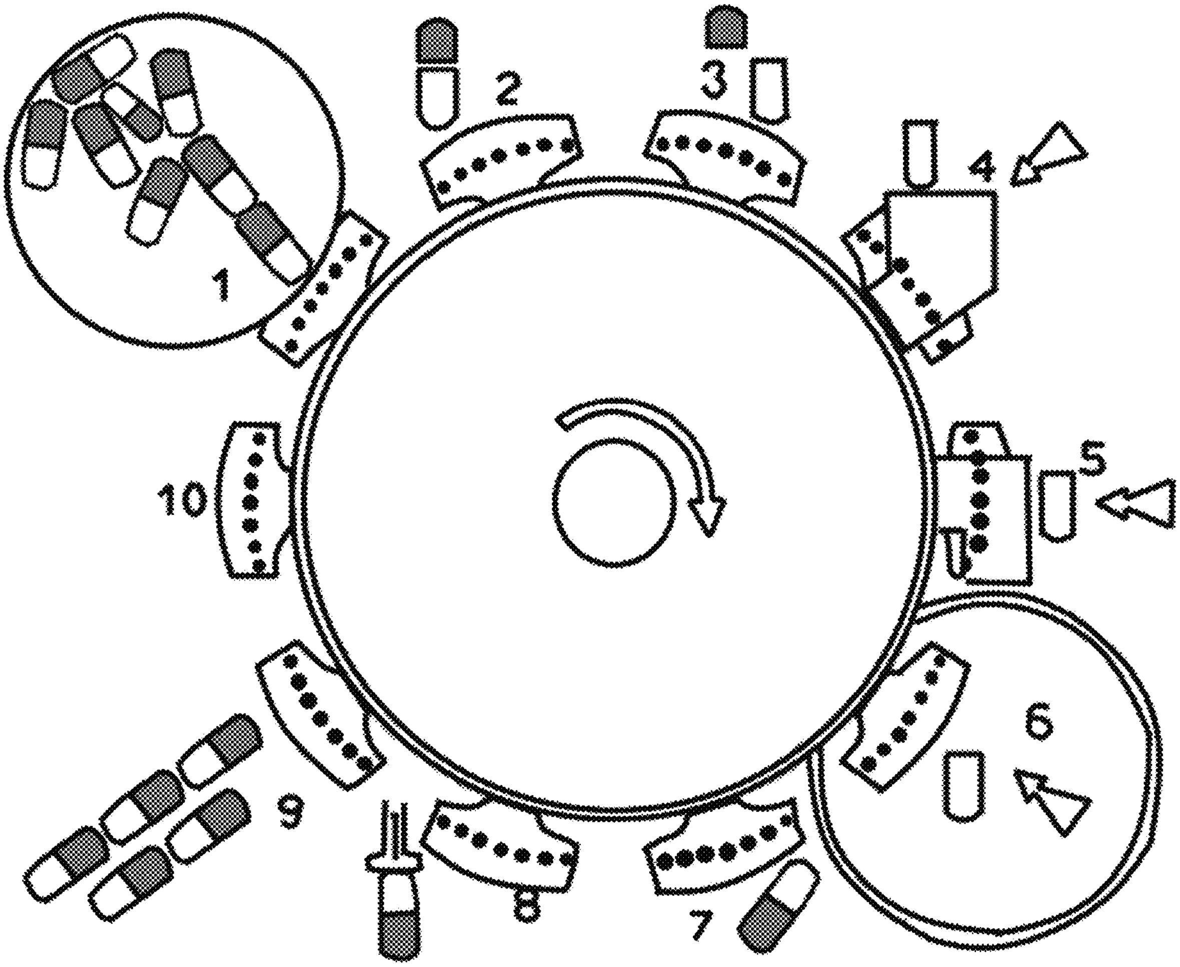
FIG. 11 illustrates a schematic diagram of a deposition apparatus system according to one embodiment of the present invention.
Figure 12:
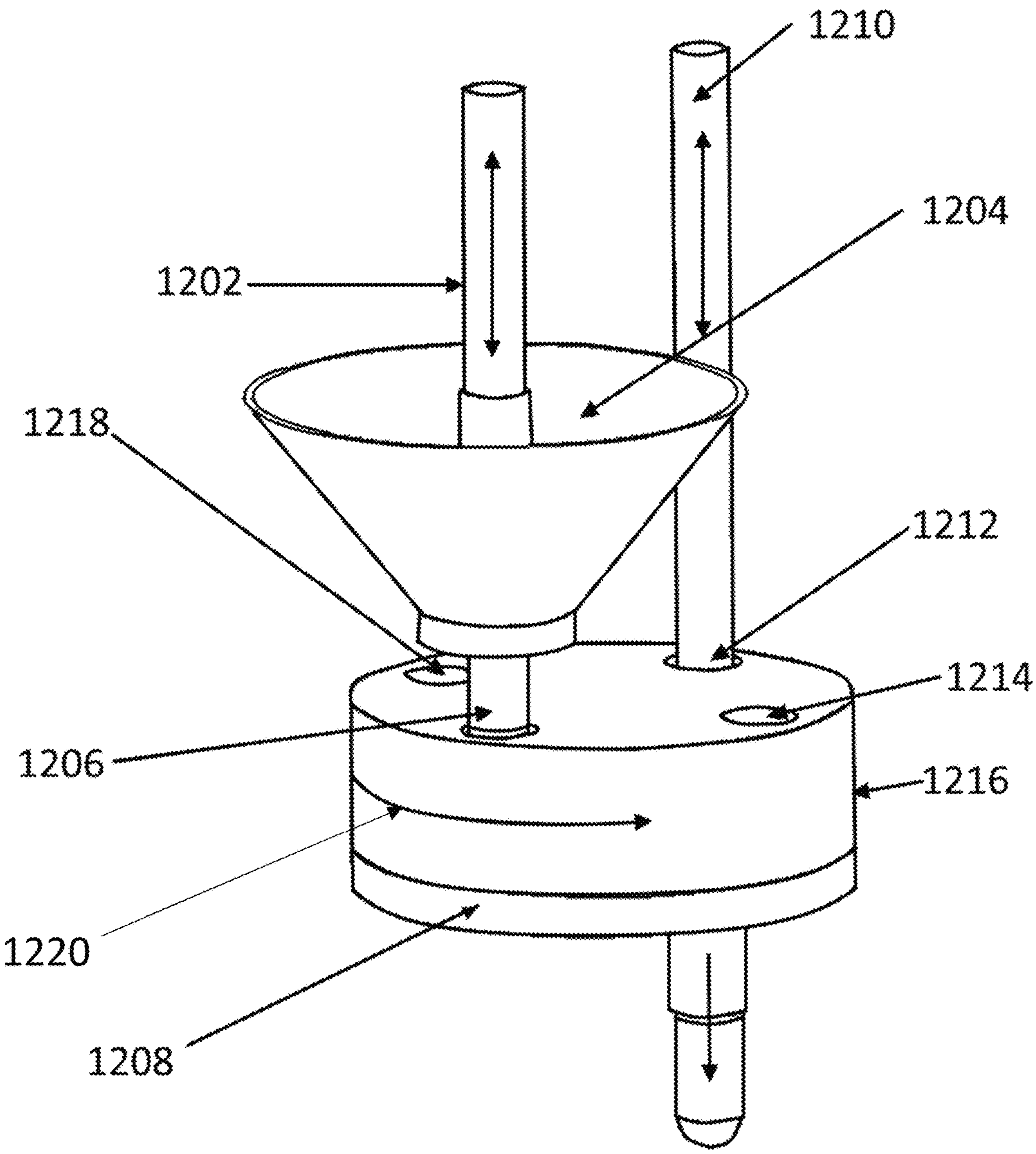
FIG. 12 illustrates a deposition apparatus according to one embodiment of the present invention.
Figure 13:
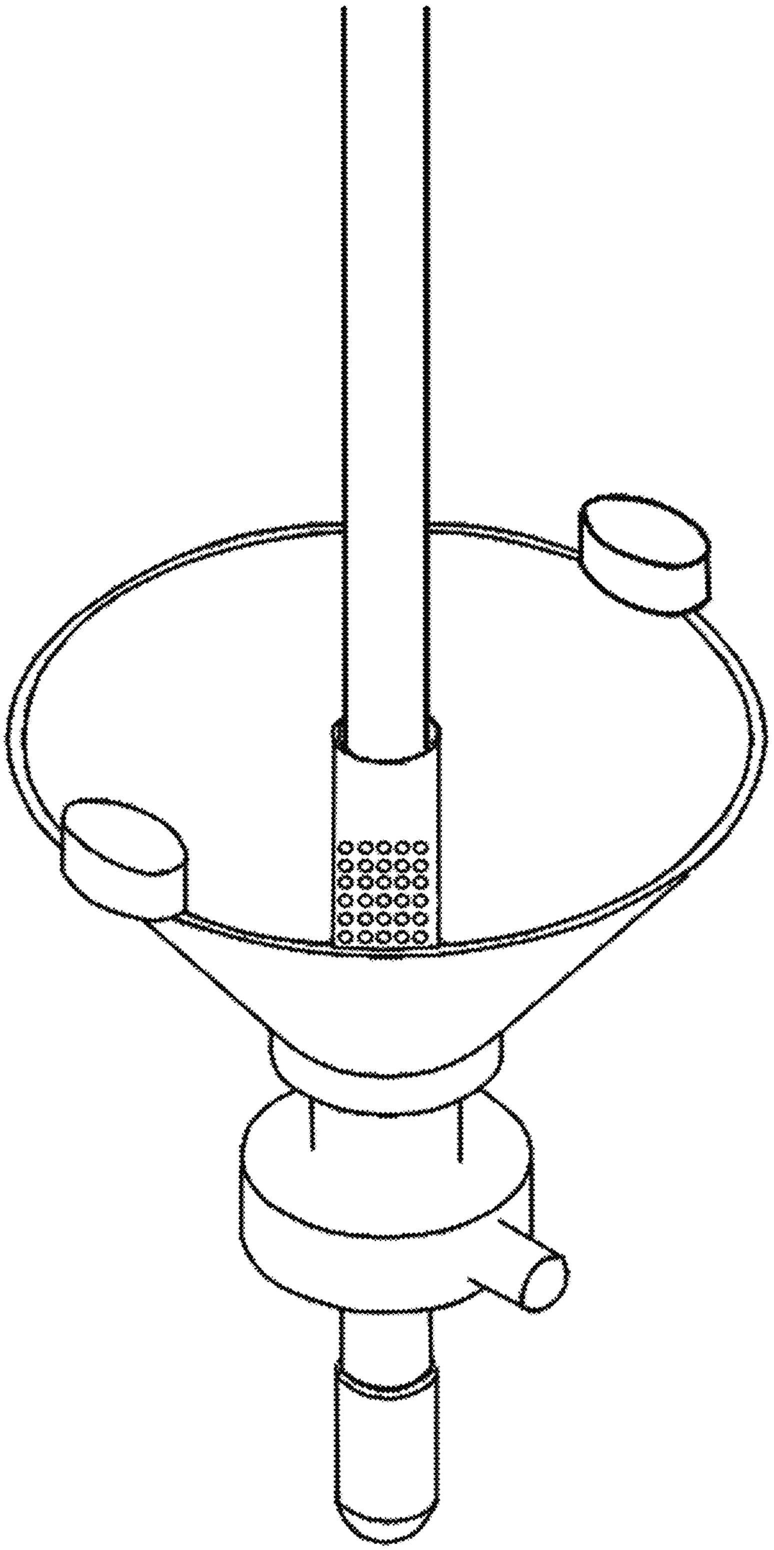
FIG. 13 illustrates a compaction actuator assembly and a powder buffer supply and sieve of a deposition apparatus according to one embodiment of the present invention.
Figure 14A:
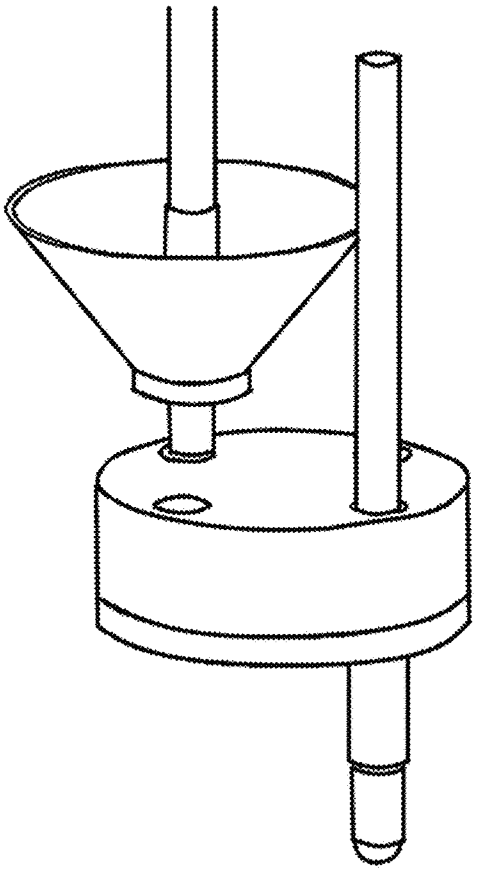
FIG. 14A illustrates a deposition apparatus according to one embodiment of the present invention.
Figure 14B:
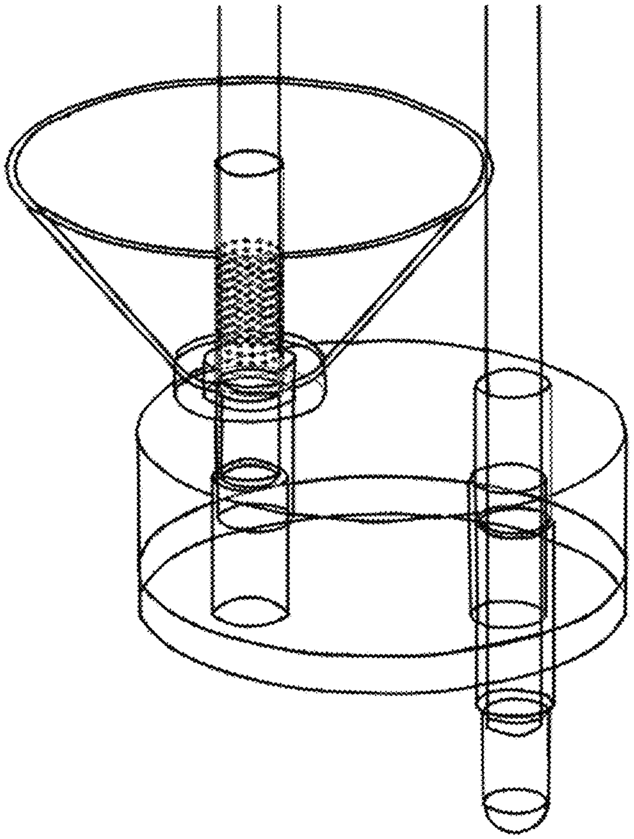
FIG. 14B illustrates a deposition apparatus according to one embodiment of the present invention.

In some embodiments, the present invention includes a deposition apparatus designed to dispense powder, collect powder, compact powder, and insert powder into a capsule as shown in FIG. 8. FIG. 8 illustrates the sequence of powder dispensing: (1) metering sieve actuated in rotation to dispense powder from buffer storage, (2) powder collected into a chamber by a vertical stroke of top plunger element, (3) top plunger compacts powder to minimum volume with force estimation from vertical actuator current and position, and (4) collection chamber bottom actuated to open the portal, then top plunger inserts compacted powder, and in some embodiments the interstitial barrier film, into target capsule.

The apparatus integrates the storage of homogenous ingredient powders with mechanical elements with features designed to dispense powders uniformly with similar physical properties. In a preferred embodiment, a cylindrical rigid sieve, perforated with a matrix pattern of orifice holes, was modeled and empirically tested to optimize powder flow. This cylindrical sieve is designed to meter a stream of powder filling its outer wall to the interior of the cylinder as a controllable actuator rotates the sieve. The apparent orifice size presented to the buffer powder supply can be varied by changing the range and frequency of reciprocating motion to optimize powder flow precisely. This dispensing device can achieve a broad range of flow dynamics to accommodate many powder characteristics by using an ultrasonic motion-capable electromechanical actuation of the metering sieve about its longitudinal axis. The selected orifice matrix for a given set of powder characteristics is based on a 3D flow model relating mechanical parameters such as orifice diameter and spacing with ingredient powders having a specific range of particle size distribution and flowability. This metering sieve may be manufactured to have the optimal orifice size and pattern using a 3D-printed cylinder or made with techniques such as electro-discharged machining (EDM) or laser machined perforations of a cylindrical tube.

The metered output of the sieve is controlled by an ultrasonic rotary actuator, whose motion is varied by frequency and amplitude of rotation under a machine learning feed forward algorithm. The training of the algorithm is performed by empirical experimentation to produce calibrations for each ingredient class.

An important innovation in the apparatus design is focused on accelerating the flow, and controlling the powder that is metered from the cylindrical sieve. State of the art for capsule filling systems with the capability to variable dose powders is typically a dosator device or "pepper mill" device. In such designs of variable powder fillers, powder flow into the capsule depends on gravity. These designs have been primarily confined to research applications, as the speed of powder filling is typically longer than 10 milligrams per second. To achieve higher flow rates, to enable powder deposition at rates up to an order of magnitude faster, this invention teaches two means to accelerate powder particle flow: (1) balanced inert gas flow between a positive flow outlet and a negative flow collector, combined with (2) an electrostatic charging of powder particles dispersed from the metering sieve to an oppositely charged target collector vessel.

The positive flow outlet in this device includes a cylindrical rod, (FIG. 3, 308), and the negative flow gas collector, (FIG. 4, 420, FIGS. 5, 502 and 508). The positive flow outlet is manufactured from specialized materials referred to as micro-porous materials. These microporous materials have specific enabling properties:

- The largest pores in this material are an order of magnitude smaller in diameter than the smallest diameter ingredient powder particle thereby stopping the infiltration of powders into the element's surface.
- The material allows the passing of inert dry gases at pressures great enough to induce the desired flow rates. The micro-porous materials inhibit flow proportionally to the surface area of the element. Pressure and surface area are design parameters that limit the rate of gas flows.
- The selected material is electrically conductive and can be charged at a level to add a charge to the flowing inert gas.
- Sintered metal micro-porous materials can be machined to achieve smooth surfaces, as would be the case for the elements 308 and 420. The selected materials design will be able to apply compressive forces great enough to achieve significant compression of deposited powders.
- The selected materials are chemically inert and do not particulate any contamination to the active ingredients.

Figure 20:
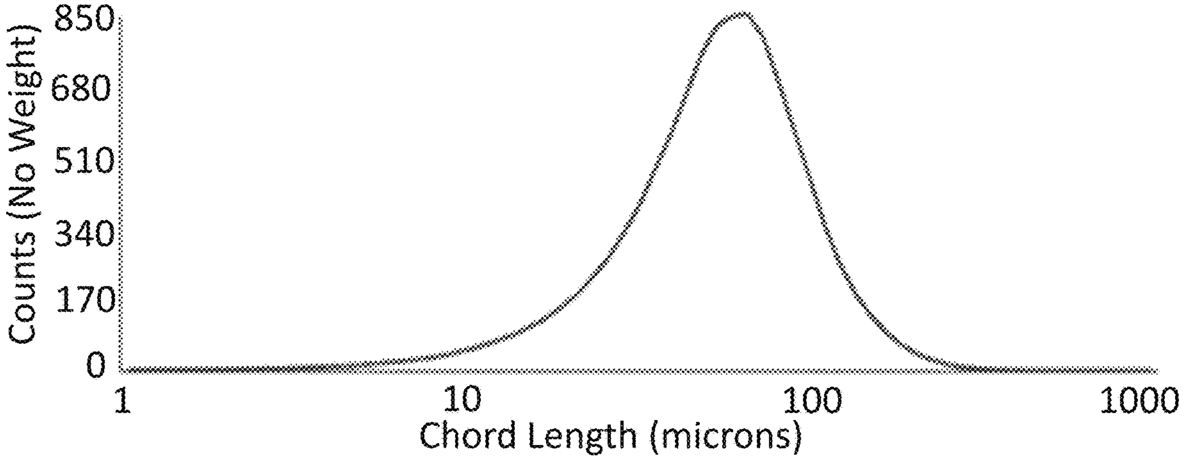
FIG. 20 illustrates a graph showing counts of particles by chord length, showing particle size distribution.

FIG. 20 illustrates a graph showing counts of particles by chord length, showing particle size distribution.

Spherical particle size can characterized by one number, the diameter (or the radius). Other types of particles have a wide variety of shapes, structures and phases, thus different three-dimensional elongations. A one-dimensional size function, such as spherical equivalent diameter, chord length, particle length or particle width, is frequently used in practice. Spherical equivalent diameter is defined as the equivalent diameter of a sphere having the same physical property. The volume based spherical equivalent diameter is obtained by calculating the diameter of a sphere with the same volume as that of the particle being studied.

A balance gas flow generator between upper micro-porous plate and lower micro-porous plate with concurrent negative top plate pressure and positive bottom plate balances pressures. This element of the design creates laminar top to bottom plate flow rates that are identical. The flow rate is controlled to match the parameters of the identified powder by the device's computer controller.

A powder collection chamber (e.g., 422, 506), includes a rigid bottom acting as the negative pressure collector made of metallic micro-porous. The powder collection chamber is charged with the opposite electrical static charge to control the flow of inert gas directing the flow of dispensed powder synchronized with the inert gas flow direction, Using in-process and real-time mass and volume measurement methods with real-time computer-controlled dispensing and compacting of each powder layer enables sub-milligram mass accuracy. The closed-loop actuation of the metering sieve mechanism receives measurements from gravimetric sensors and coulombic charged particle counter in near real-time as a feed-forward signal to modify the actuation range, frequency, and speed. The feedforward control algorithm is adapted to the ingredient parameters by machine learning on datasets from prior empirical testing of similarly characterized powders. The hardware configuration of the deposition apparatus and the control parameters enables the deposition apparatus to be applied to a broad range of powders, with a range of powder characteristics achieving high-precision deposition. This adaptive computer controls enable ingredient layers to be dispensed in increments of less than one milligram as commanded in a prescription for the composition of a polypill.

In some embodiments of the deposition apparatus, an interstitial film of inert materials is sometimes deposited or inserted as a preform between layers to prevent chemical interaction between layered ingredients. The addition of this interstitial film is not required where the active powders in adjacent layers have been shown through chemical analysis over to be non-interacting and stable over the expected or regulatory allowed beyond use periods for the end product. For those ingredients that may chemically interact or mechanically bind, the addition of an inert separation layer adds a substantial barrier. Such interior capsule barriers between ingredients may be constructed of the same materials as the gel or cellulose capsules, thereby having the same rates of dissolution in digestive tract. Other commonly used materials may be dispensed by spraying the dry compounds, after deposition of an ingredient layer, then compressing the sprayed materials to form a barrier layer. Inert ingredients approved as excipients may be used, including microcrystalline cellulose, magnesium stearate, silicon dioxide, chitosan, or dicalcium phosphate have been approved for such uses. Combination of such powders designed as sealers and binder materials for medicinal pills, such as commercial brands such as "Firmapress" made by LFA Machines Inc, are ideal in that once dispensed in dry form, this material forms a rigid layer when compressed. The dispensing and compression method for the interstitial film is illustrated in FIG. 6.

The additive manufacturing sequence of operation is:

1. Bulk supply of characterized powder ('CPWD') loaded into storage vessel (e.g., bulk active ingredient powder storage 202)
    a. Identity device loaded with parametric data for CPWD loaded
    b. Dispensing Apparatus ('DA1') configured for CPWD
    c. 202 assembled to DA1
    d. DA1 mounted to filling machine
    e. Identification Symbol 216 data transfer to DA1 computer controller and filling machine computer controller
2. Buffer loading mechanism (e.g., compaction rod actuator 210) actuated
    a. Buffer storage vessel 212 loading
    b. 412 gravimetric sensors signal mass loading in 212/404
    c. 210 completes loading when target mass load reached
    d. Process repeats once mass load below target level detected by 412 e. 210 closes and seals the buffer storage vessel 212

3. Dispense command for next ingredient deposit sent to metering assembly
   a. Sequence diagrams bulk active ingredient powder storage 302 to powder stream 414
4. Inert gas flow initiated (FIGS. 4 and 5)
   a. Porous top plate with positive pressure
   b. Porous bottom plate with negative pressure equal to positive pressure at 408
   c. Directional inert gas flow from 408 to 420 through central volume of metering cylinder, 406
   d. Electrostatic charge initiated at 408, opposite charge at 420
   e. Charged particle counting initiated at 424 electrode
5. Ingredient metering process
   a. Metering cylinder actuator commanded start ultrasonic rotary actuator 412 begins commanded rotation/counterrotation at high frequency between 5 to 25 kHz
   b. Control loop senses charged particle transfer, and net mass change signal by 402 gravimetric sensors, calculated to ingredient mass using parametric data
   c. Powder released from metering sieve 406 accelerated by gas flow and electrostatic charge toward 420, accumulating in 422 vessel
   d. Actuator rotation stopped when commanded mass deposit level at 422 electrode detected based on electrostatic particle count and net mass at 402
   e. Net mass transfer at 402 verified, 502 to 508 repeats until commanded mass deposited at 424
6. Metering cylinder clearing, accumulation (FIGS. 3 and 4)
   a. Positive Inert gas flow stopped at 408/308
   b. Vertically actuated cylinder 306 moves downward to clear cylindrical metering sieve 304
   c. 308 stops at top of 424
   d. 308 moves to compact to commanded volume at 416
7. Ejection of compacted ingredient
   a. 424 aligned axially with 426 capsule
   b. 418 actuator retracts bottom porous airflow head 420 bottom plate to make clearance through 424
   c. Vertically actuated cylinder 306 ejects compacted ingredient, powder 416 through 424
   d. Vertically actuated cylinder 306 compresses powder 416 ingredient to commanded level in 426
   e. 408/308 porous plate set to minimal positive pressure to release powder 416
   f. Vertically actuated cylinder 306 retracts to top of 422 until next cycle, providing closure to metering sieve 406
   g. 426 capsule moves to next ingredient deposition device In some embodiments, as shown in FIGS. 12-14B, a deposition apparatus is disclosed. The deposition apparatus 1200 includes a porous top plate and compaction actuator assembly 1202, a powder buffer storage supply and sieve 1204, a powder dispensing process 1206, a fixed porous bottom surface 1208, a compacted powder slug ejection actuator 1210, a capsule filling process 1212, an intermediate position for application of an interstitial barrier 1214, and an indexing plate containing powder accumulation vessels 1216.

For example, and not limitation, the powder buffer storage supply and sieve 1204 includes a buffer storage vessel with a conical shape, a cylindrical metering sieve with a pattern of aperture sized to emit powder particles when rotary actuation is applied, a vertically actuated cylinder for powder movement, sieve clearing, and compaction, and a micro-porous head to apply positive or negative gas flow, gas ionization, and compaction force. At the center of the buffer storage vessel is a deposition mechanism. The deposition mechanism includes a cylindrical metering sieve with a matrix of orifices that is actuated about the long cylinder axis. The accumulator shaft is actuated vertically and concentric to the cylindrical metering sieve. The vertically actuated cylinder carries the micro-porous flow and compaction top plate which generates inert gas flow and serves to clear the sieve, accumulate the residue powder and compact the residue powder in the collection vessel at the bottom.

The deposition apparatus is operable to move between a plurality of a positions. At the first position, the porous top plate and compaction actuator assembly 1202 is designed for dispensing and compacting powder in a multi-component capsule (e.g., polypill). After the powder is dispensed and compacted, the multi-component capsule is rotated as shown by arrow 1220 to a second position 1214. In the second position 1214, the deposition apparatus can apply an interstitial barrier to the multi-component capsule (e.g., polypill). The deposition apparatus is further designed to rotate the multi-component capsule to a third position 1212. In the third position 1212, additional powder is dispensed on top of the previous dispensed powder in the multi-component capsule via the compacted powder slug ejection actuator 1210. The compacted powder slug ejection actuator 1210 is further designed to eject the multi-component capsule after the additional powder has been dispensed to the multi-component capsule. In a fourth position 1218, the deposition apparatus is cleaned.

In some embodiments, the deposition apparatus includes a gravimetric mass sensor (e.g., inductive, capacitive, strain), a buffer storage vessel, a sieve for metering powder into a deposition channel, a porous airflow head for creating positive pressure to accelerate powder flow, a powder load in the buffer storage vessel, an ultrasonic rotary actuator of sieve, a powder stream flowing into an accumulation vessel, powder accumulate collected in the accumulation vessel, an actuator for escapement of the accumulation vessel, a bottom porous airflow head for negative pressure to accelerate powder flow, the accumulation vessel and charge cathode, a capsule alignment tube, and a target capsule for filing. For example, and not limitation, the metering sieve is actuated by a controlled variable frequency ultrasonic rotary actuator. The frequency and amplitude of rotation is controlled a closed loop motion controller.

In some embodiments, the deposition apparatus includes an optical sensor, a charge anode, and a charge sensing circuit. The optical sensor is designed to detect and monitor flow of powder in real-time or near real-time. For example, and not limitation, the optical sensor includes a Flow Watch sensor from Medicoat, which is herein incorporated by reference in its entirety. The optical sensor senses charged particle transfer, and net mass change signal is monitored in combination with at least one gravimetric sensor. The deposition apparatus is designed to calculated ingredient mass using parametric data. Powder released from a metering sieve is accelerated by gas flow and electrostatic charge and accumulates in capsule. The optical sensor is further operable to detect flow interruptions and/or flow pulsations. Advantageously, this enables the deposition apparatus to determine when a desired amount or threshold of powder has been transferred.

In some embodiments, the deposition apparatus designed for inert gas and electro-statically charged particle flow. For example, and not limitation, the deposition apparatus includes a positive flow inert gas element and electrostatic charge electrode, a powder in a conical buffer feeder supplying a cylindrical metering sieve, a powder collection vessel for accumulating powder flow, and a negative flow collector and particle charge sink. For further example, and not limitation, the deposition apparatus includes the use of microporous materials at top and bottom of the cylindrical metering sieve, powder flow is amplified with positive pressure from top plunger element and negative pressure at the bottom of the collection chamber. Powder collection chamber includes a bottom metallic microporous receiver surface with the opposite electrical static charge to control the flow of inert gas directing the flow of dispensed powder driven by the inert gas flow direction, Powder flow rate is amplified by positive pressure from top plunger plate and negative pressure at the bottom plate of the collection chamber.

In some embodiments, the deposition apparatus is designed to generate an interstitial barrier film. For example, and not limitation, the deposition apparatus is designed to dispense the barrier film materials via a sprayer, compress the barrier film and deposited ingredient, and eject the deposited ingredient and barrier layer into a preformed capsule body. An interstitial film is dispensed as a composite powder and compressed between layers of ingredients to create a barrier.

In some embodiments, the deposition apparatus is designed to insert pre-formed interstitial barrier films on top of a compressed ingredient layer. The deposition apparatus can include a preformed index tape including empty pre-forms, ready to insert preforms, and empty position of used pre-formed films. The deposition apparatus further includes a pre-form inserted on top of compacted ingredient powders and an indexing actuator to move the preformed index tape to a second position. The deposition apparatus further includes a compacted ingredient powder layer.

In some embodiments, the deposition apparatus is designed to dispense powder, collect powder, compact powder, and insert powder into a capsule. The deposition apparatus is designed for a sequence of powder dispensing including: (1) metering sieve actuated in rotation to dispense powder from buffer storage, (2) powder collected into a chamber by a vertical stroke of top plunger element, (3) top plunger compacts powder to minimum volume with force estimation from vertical actuator current and position, and (4) collection chamber bottom actuated to open the portal, then top plunger inserts compacted powder, and in some embodiments the interstitial barrier film, into target capsule.

The deposition apparatus integrates the storage of homogenous ingredient powders with mechanical elements with features designed to dispense powders uniformly with similar physical properties. In some embodiments, a cylindrical rigid sieve, perforated with a matrix pattern of orifice holes, was modeled and empirically tested to optimize powder flow. This cylindrical sieve is designed to meter a stream of powder filling its outer wall to the interior of the cylinder as a controllable actuator rotates the sieve. The apparent orifice size presented to the buffer powder supply can be varied by changing the range and frequency of reciprocating motion to optimize powder flow precisely. This dispensing device can achieve a broad range of flow dynamics to accommodate many powder characteristics by using an ultrasonic motion-capable electromechanical actuation of the metering sieve about its longitudinal axis. The selected orifice matrix for a given set of powder characteristics is based on a 3D flow model relating mechanical parameters such as orifice diameter and spacing with ingredient powders having a specific range of particle size distribution and flowability. This metering sieve may be manufactured to have the optimal orifice size and pattern using a 3D-printed cylinder or made with techniques such as electro-discharged machining (EDM) of a cylindrical tube.

The metered output of the sieve is controlled by an ultrasonic rotary actuator, whose motion is varied by frequency and amplitude of rotation under a machine learning feed forward algorithm. The training of the algorithm is performed by empirical experimentation to produce calibrations for each ingredient class.

An important innovation in the deposition apparatus design is focused on accelerating the flow, and controlling the powder that is metered from the cylindrical sieve. State of the art for capsule filling systems with the capability to variable dose powders is typically a dosator device or "pepper mill" device. In such designs of variable powder fillers, powder flow into the capsule depends on gravity. These designs have been primarily confined to research applications, as the speed of powder filling is typically longer than 10 milligrams per second. To achieve higher flow rates, to enable powder deposition at rates up to an order of magnitude faster, the deposition apparatus includes at least two means to accelerate powder particle flow: (1) balanced inert gas flow between a positive flow outlet and a negative flow collector, combined with (2) an electrostatic charging of powder particles dispersed from the metering sieve to an oppositely charged target collector vessel. In some embodiments, the deposition apparatus is designed to achieve a powder flow rate of at least 150 mg/sec. In some embodiments, the deposition apparatus is designed to achieve a powder flow of between about 150 mg/sec and about 200 mg/sec.

In some embodiments, an interstitial film of inert materials is sometimes deposited or inserted as a preform between layers to prevent chemical interaction between layered ingredients. The addition of this interstitial film is not required where the active powders in adjacent layers have been shown through chemical analysis over to be non-interacting and stable over the expected or regulatory allowed beyond use periods for the end product. For those ingredients that may chemically interact or mechanically bind, the addition of an inert separation layer adds a substantial barrier. Such interior capsule barriers between ingredients may be constructed of the same materials as the gel or cellulose capsules, thereby having the same rates of dissolution in digestive tract. Other commonly used materials may be dispensed by spraying the dry compounds, after deposition of an ingredient layer, then compressing the sprayed materials to form a barrier layer. Inert ingredients approved as excipients may be used, including microcrystalline cellulose, magnesium stearate, silicon dioxide, chitosan, or dicalcium phosphate have been approved for such uses. Combination of such powders designed as sealers and binder materials for medicinal pills, such as commercial brands such as "Firmapress" made by LFA Machines Inc, are ideal in that once dispensed in dry form, this material forms a rigid layer when compressed.

By way of example, and not limitation, the deposition apparatus includes a controller for controlling the operations (e.g., sensor monitoring, capsule filling, capsule compacting) of the deposition apparatus. The controller may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a state machine, gated or transistor logic, discrete hardware components, or any other suitable entity or combinations thereof that can perform calculations, process instructions for execution, and/or other manipulations of information.

In some embodiments, multiple processors and/or multiple buses may be used, as appropriate, along with multiple memories of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function. According to various embodiments, the computer system may operate in a networked environment using logical connections to local and/or remote computing devices through a network. A computing device may connect to a network through a network interface unit connected to a bus. Computing devices may communicate communication media through wired networks, direct-wired connections or wirelessly, such as acoustic, RF, or infrared, through an antenna in communication with the network antenna and the network interface unit, which may include digital signal processing circuitry when necessary. The network interface unit may provide for communications under various modes or protocols.

Aspects of the present invention may be implemented as a system, method or computer program product. They may be implemented as an entirely hardware embodiment, an entirely software embodiment (including firmware, resident software, micro-code, etc.) or an embodiment combining software and hardware aspects that may all generally be referred to herein as a "circuit," "module" or "system." Aspects of the present invention may be implemented as a computer program product embodied in one or more computer-readable medium(s) storing computer-readable program code. The terms "machine-readable medium" and "machine-readable storage medium" may include a single medium or multiple media (e.g., a centralized or distributed database, and/or associated caches and servers) that store one or more sets of instructions. These terms may include any medium that is capable of storing, encoding or carrying a set of instructions for execution by the machine and that cause the machine to perform any one or more of the methodologies of the presently disclosed technique and innovation.

Figure 15:
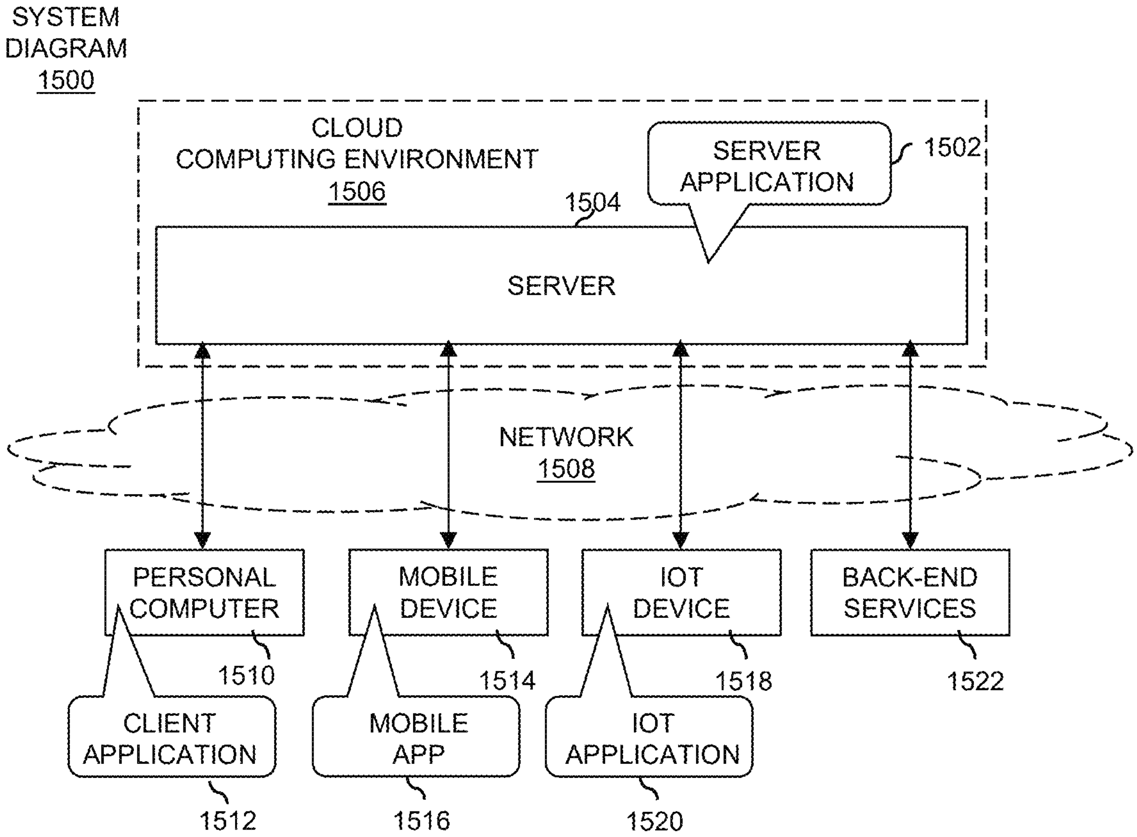
FIG. 15 illustrates a schematic diagram of a deposition apparatus system according to one embodiment of the present invention.

FIG. 15 depicts a system diagram 1500 illustrating a client/server architecture in accordance with embodiments of the present disclosure. The server application 1502 is configured to provide a video application and mobile application for a deposition apparatus and related systems and methods. A server application 1502 is hosted on a remote server 1504 within a cloud computing environment 1506. The server application 1502 is provided on a non-transitory computer-readable medium including a plurality of machine-readable instructions, which when executed by one or more processors of the server 1504, are adapted to cause the server 1504 to generate the video platform and mobile application.

The server application 1502 is configured to communicate over a network 1508. In a preferred embodiment, the network 1508 is the Internet. In other embodiments, the network 1508 may be restricted to a private local area network (LAN) and/or private wide area network (WAN). The network 1508 provides connectivity with a plurality of client devices including a personal computer 1510 hosting a client application 1512, a mobile device 1514 hosting a mobile app 1516. The network 1508 also provides connectivity for an Internet-Of-Things (IoT) device 1518 hosting an IoT application 1520, and to back-end services 1522. Advantageously, the back-end services are operable to communicate with third-party application programming interfaces (APIs) to either provide or receive data that can be used by the system to provide recommendations. Third-party applications provide algorithms for analysis of data. The back-end services may provide data gathered within the deposition apparatus system through the third-party APIs and receives results from the algorithms provided back to the back-end services to provide further recommendations or take further actions within the deposition apparatus and related systems.

Figure 16:
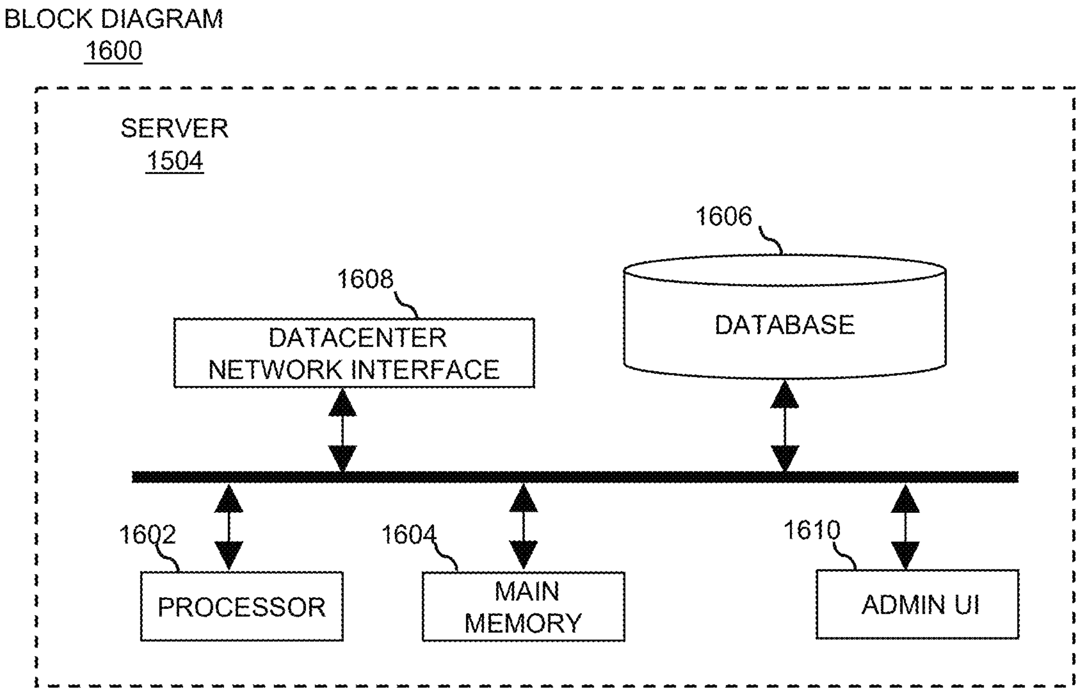
FIG. 16 illustrates a schematic diagram of a remote server of a deposition apparatus system according to one embodiment of the present invention.

FIG. 16 depicts a block diagram 1600 of the server 1504 of FIG. 15 for hosting at least a portion of the server application 1502 of FIG. 15 in accordance with embodiments of the present disclosure. The server 1504 may be any of the hardware servers referenced in this disclosure. The server 1504 may include at least one of a processor 1602, a main memory 1604, a database 1606, a datacenter network interface 1608, and an administration user interface (UI) 1610. The server 1504 may be configured to host one or more virtualized servers. For example, the virtual server may be an Ubuntu® server or the like. The server 1504 may also be configured to host a virtual container. For example, the virtual server may be the DOCKER® virtual server or the like. In some embodiments, the virtual server and or virtual container may be distributed over a plurality of hardware servers using hypervisor technology.

The processor 1602 may be a multi-core server class processor suitable for hardware virtualization. The processor 1602 may support at least a 64-bit architecture and a single instruction multiple data (SIMD) instruction set. The memory 1604 may include a combination of volatile memory (e.g., random access memory) and non-volatile memory (e.g., flash memory). The database 1606 may include one or more hard drives.

The datacenter network interface 1608 may provide one or more high-speed communication ports to the data center switches, routers, and/or network storage appliances. The datacenter network interface may include high-speed optical Ethernet, InfiniBand (IB), Internet Small Computer System Interface iSCSI, and/or Fibre Channel interfaces. The administration UI may support local and/or remote configuration of the server by a data center administrator.

Figure 17:
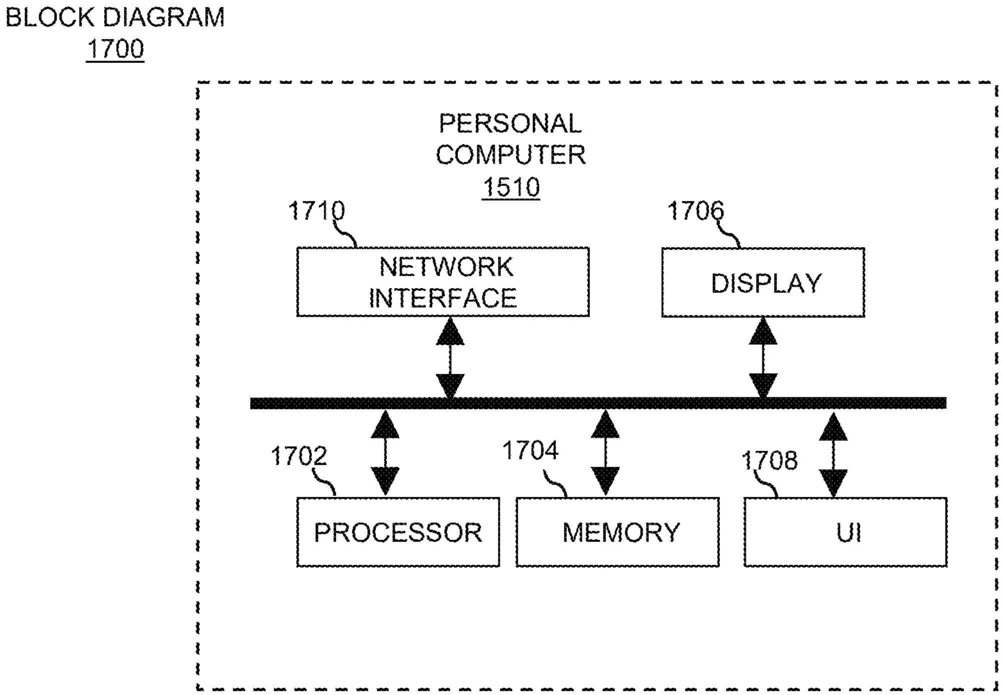
FIG. 17 illustrates a schematic diagram of a personal computer of a deposition apparatus system according to one embodiment of the present invention.

FIG. 17 depicts a block diagram 1700 of the personal computer 1510 of FIG. 15 in accordance with embodiments of the present disclosure. The personal computer 1510 may be any of the devices referenced in this disclosure. The personal computer 1510 may include at least a processor 1702, a memory 1704, a display 1706, a user interface (UI) 1708, and a network interface 1710. The personal computer 1510 may include an operating system to run a web browser and/or the client application 1512 shown in FIG. 15. The operating system (OS) may be a Windows® OS, a Macintosh® OS, or a Linux® OS. The memory 1704 may include a combination of volatile memory (e.g., random access memory) and non-volatile memory (e.g., solid state drive and/or hard drives).

The network interface 1710 may be a wired Ethernet interface or a Wi-Fi interface. The personal computer 1510 may be configured to access remote memory (e.g., network storage and/or cloud storage) via the network interface 1710. The UI 1708 may include a keyboard, and a pointing device (e.g., mouse). The display 1706 may be an external display (e.g., computer monitor) or internal display (e.g., laptop). In some embodiments, the personal computer 1510 may be a smart TV. In other embodiments, the display 1706 may include a holographic projector.

Figure 18:
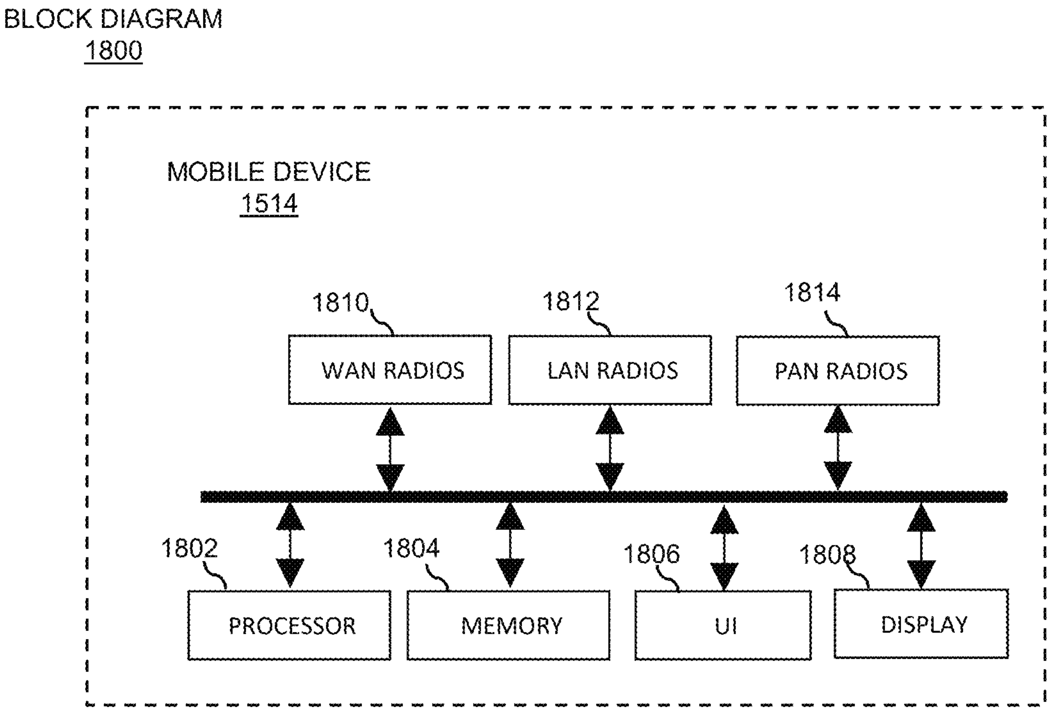
FIG. 18 illustrates a schematic diagram of a mobile device of a deposition apparatus system according to one embodiment of the present invention.

FIG. 18 depicts a block diagram 1800 of the mobile device 1514 of FIG. 15 in accordance with embodiments of the present disclosure. The mobile device 1514 may be any of the remote devices referenced in this disclosure. The mobile device 1514 may include an operating system to run a web browser and/or the mobile app 1516 shown in FIG. 15. The mobile device 1514 may include at least a processor 1802, a memory 1804, a UI 1806, a display 1808, WAN radios 1810, LAN radios 1812, and personal area network (PAN) radios 1814. In some embodiments the mobile device 1514 may be an iPhone® or an iPad®, using iOS® as an OS. In other embodiments the mobile device 1514 may be a mobile terminal including Android® OS, BlackBerry® OS, Chrome® OS, Windows Phone® OS, or the like.

In some embodiments, the processor 1802 may be a mobile processor such as the Qualcomm® Snapdragon™ mobile processor. The memory 1804 may include a combination of volatile memory (e.g., random access memory) and non-volatile memory (e.g., flash memory). The memory 1804 may be partially integrated with the processor 1802. The UI 1806 and display 1808 may be integrated such as a touchpad display. The WAN radios 1810 may include 2G, 3G, 4G, and/or 5G technologies. The LAN radios 1812 may include Wi-Fi technologies such as 802.11a, 802.11b/g/n, and/or 802.11ac circuitry. The PAN radios 1814 may include Bluetooth® technologies.

Figure 19:
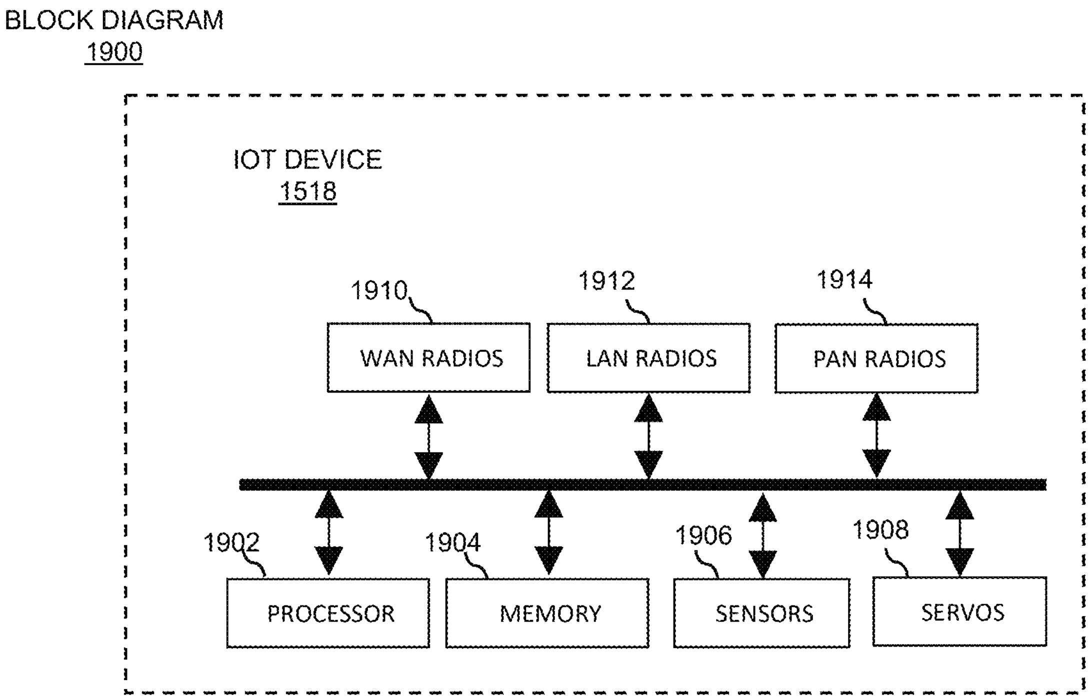
FIG. 19 illustrates a schematic diagram of an internet-of-things (IoT) device of a deposition apparatus system according to one embodiment of the present invention.

FIG. 19 depicts a block diagram 1900 of the IoT device 1518 of FIG. 15 in accordance with embodiments of the present disclosure. The IoT device 1518 may be any of the remote devices referenced in this disclosure. The IoT device 1518 includes a processor 1902, a memory 1904, sensors 1906, servos 1908, WAN radios 1910, LAN radios 1912, and PAN radios 1914. The processor 1902, a memory 1904, WAN radios 1910, LAN radios 1912, and PAN radios 1914 may be of similar design to the processor 1802, a memory 1804, WAN radios 1810, LAN radios 1812, and PAN radios 1814 of the mobile device 1514 of FIG. 18. The sensors 1906 and servos 1908 may include any applicable components related to IoT devices such as a monitoring device, a smart appliance, a virtual reality device, an augmented reality device, or the like.

Any combination of one or more computer-readable medium(s) may be utilized. The computer-readable medium may be a computer-readable signal medium or a computer-readable storage medium (such as non-transitory computer-readable storage media). A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A powder deposition apparatus for capsules comprising:

a powder storage including a desiccated inert gas atmosphere and powder;

a buffer storage vessel;

an actuator designed to replenish the buffer storage vessel;

a feeder designed to load a capsule;

a compaction rod actuator;

at least one mass measuring sensor;

a cylindrical metering sleeve assembly including a cylindrical metering sieve;

an ultrasonic rotary actuator; and an inert gas inlet and pressure regulator.

2. The powder deposition apparatus of claim 1 further comprising an identification symbol, wherein the identification symbol is related to the powder.

3. The powder deposition apparatus of claim 1, wherein the buffer storage vessel includes a conical shape.

4. The powder deposition apparatus of claim 1, wherein the cylindrical metering sieve includes a plurality of apertures, wherein, when the cylindrical metering sieve is rotated via the ultrasonic rotary actuator, the plurality of apertures release particles of the powder.

5. The powder deposition apparatus of claim 1, wherein the cylindrical metering sieve is operable to apply a positive gas flow, a negative gas flow, a gas ionization, and/or a compaction force.

* * * * *